United States Patent
Wan et al.

(10) Patent No.: US 12,456,230 B2
(45) Date of Patent: Oct. 28, 2025

(54) GEOMETRY RECONSTRUCTION METHOD, DECODER AND COMPUTER STORAGE MEDIUM

(71) Applicant: GUANGDONG OPPO MOBILE TELECOMMUNICATIONS CORP., LTD., Dongguan (CN)

(72) Inventors: Shuai Wan, Dongguan (CN); Zhang Chen, Dongguan (CN); Zhecheng Wang, Dongguan (CN); Fuzheng Yang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 302 days.

(21) Appl. No.: 18/228,066

(22) Filed: Jul. 31, 2023

(65) Prior Publication Data

US 2023/0377207 A1 Nov. 23, 2023

Related U.S. Application Data

(63) Continuation of application No. PCT/CN2021/076370, filed on Feb. 9, 2021.

(51) Int. Cl.
*G06T 9/00* (2006.01)

(52) U.S. Cl.
CPC .............. *G06T 9/001* (2013.01); *G06T 9/002* (2013.01)

(58) Field of Classification Search
None
See application file for complete search history.

(56) References Cited

U.S. PATENT DOCUMENTS

| 10,861,196 | B2 | 12/2020 | Mammou | |
|---|---|---|---|---|
| 11,153,573 | B2* | 10/2021 | Yu | H04N 19/1883 |
| 11,742,878 | B2* | 8/2023 | Zhang | H04N 19/96 |
| | | | | 341/899 |
| 11,917,166 | B2* | 2/2024 | Yu | H04N 19/1883 |
| 11,936,858 | B1* | 3/2024 | Panusopone | H04N 19/159 |

(Continued)

FOREIGN PATENT DOCUMENTS

| CN | 110418135 A | 11/2019 |
|---|---|---|
| CN | 110765298 A | 2/2020 |
| CN | 112218079 A | 1/2021 |

OTHER PUBLICATIONS

International Search Report in the international application No. PCT/CN2021/076370, mailed on Aug. 16, 2021. 5 pages with English translation.

(Continued)

*Primary Examiner* — Anand P Bhatnagar
(74) *Attorney, Agent, or Firm* — BAYES PLLC

(57) ABSTRACT

A geometry reconstruction method performed by a decoder includes that a neighbouring node of a current node is determined based on location information of the current node; a factor of impact of the neighbouring node in direction along a preset axis on the current node is determined based on attribute information of the neighbouring node; a weight of the neighbouring node of the current node is determined; and coordinates of the current node after geometry reconstruction are determined based on the weight of the neighbouring node and the factor of impact of the neighbouring node in direction along the preset axis on the current node.

20 Claims, 8 Drawing Sheets

(56) References Cited

U.S. PATENT DOCUMENTS

| | | | |
|---|---|---|---|
| 12,200,232 B2* | 1/2025 | Panusopone | H04N 19/70 |
| 12,238,300 B2* | 2/2025 | Yu | H04N 19/159 |
| 2019/0080483 A1 | 3/2019 | Mammou | |
| 2022/0014760 A1* | 1/2022 | Yu | H04N 19/593 |
| 2022/0247427 A1* | 8/2022 | Zhang | H03M 7/3079 |
| 2023/0105035 A1* | 4/2023 | Yu | H04N 19/126 |
| | | | 375/240.13 |
| 2024/0179305 A1* | 5/2024 | Panusopone | H04N 19/1883 |
| 2024/0205418 A1* | 6/2024 | Yu | G01B 11/002 |
| 2024/0394956 A1* | 11/2024 | Woop | G06F 9/5016 |
| 2025/0168360 A1* | 5/2025 | Yu | H04N 19/126 |
| 2025/0175627 A1* | 5/2025 | Panusopone | H04N 19/105 |

OTHER PUBLICATIONS

Written Opinion of the International Search Authority in the international application No. PCT/CN2021/076370, mailed on Aug. 16, 2021. 6 pages with English translation.

* cited by examiner

GEOMETRY RECONSTRUCTION METHOD, DECODER AND COMPUTER STORAGE MEDIUM

CROSS-REFERENCE TO RELATED APPLICATION(S)

This application is a continuation of International Patent Application No. PCT/CN2021/076370 filed on Feb. 9, 2021, which is incorporated herein by reference in its entirety.

BACKGROUND

In a geometry-based point cloud compression (G-PCC) framework, geometric information of point clouds and attribute information corresponding to the respective point clouds are coded separately. After geometry coding is performed, geometric information is reconstructed, and coding of the attribute information will depend on the reconstructed geometric information. Attribute information coding mainly targets coding of colour information, to transform colour information from a spatial domain into a frequency domain, and to obtain a high-frequency coefficient and a low-frequency coefficient. Finally, quantification and entropy coding are performed on the coefficients, to generate a binary bitstream.

Spatial scalability is an important function of the G-PCC framework. A point cloud thumbnail is generated by decoding bitstream information of some point clouds, which presently applies mainly to a G-PCC decoder based on octree geometric information. A skip layer denotes an octree layer in the G-PCC decoder that does not have to be decoded. However, at present, for an existing geometry reconstruction process after spatial scalability, a difference in distribution of points inside different nodes is not taken into account, resulting in a great geometric error in geometry reconstruction after spatial scalability.

SUMMARY

Embodiments of the disclosure relate to the field of coding technologies and provide a method for geometry reconstruction, a decoder, and a computer storage medium.

In a first aspect, embodiments of the disclosure provide a method for geometry reconstruction applying to a decoder. The method includes the following operations.

A neighbouring node of a current node is determined based on location information of the current node.

A factor of impact of the neighbouring node in direction along a preset axis on the current node is determined based on attribute information of the neighbouring node.

A weight of the neighbouring node of the current node is determined.

Coordinates of the current node after geometry reconstruction are determined based on the weight of the neighbouring node and the factor of impact of the neighbouring node in direction along the preset axis on the current node.

In a second aspect, embodiments of the disclosure provide a decoder. The decoder includes a memory and a processor.

The memory is configured to store a computer program executable on the processor.

The processor is configured to implement the method of the first aspect.

In a third aspect, embodiments of the disclosure provide a non-transitory computer storage medium having stored thereon a computer program which, when executed by at least one processor, implements the method of the first aspect.

DETAILED DESCRIPTION

Figure 1:
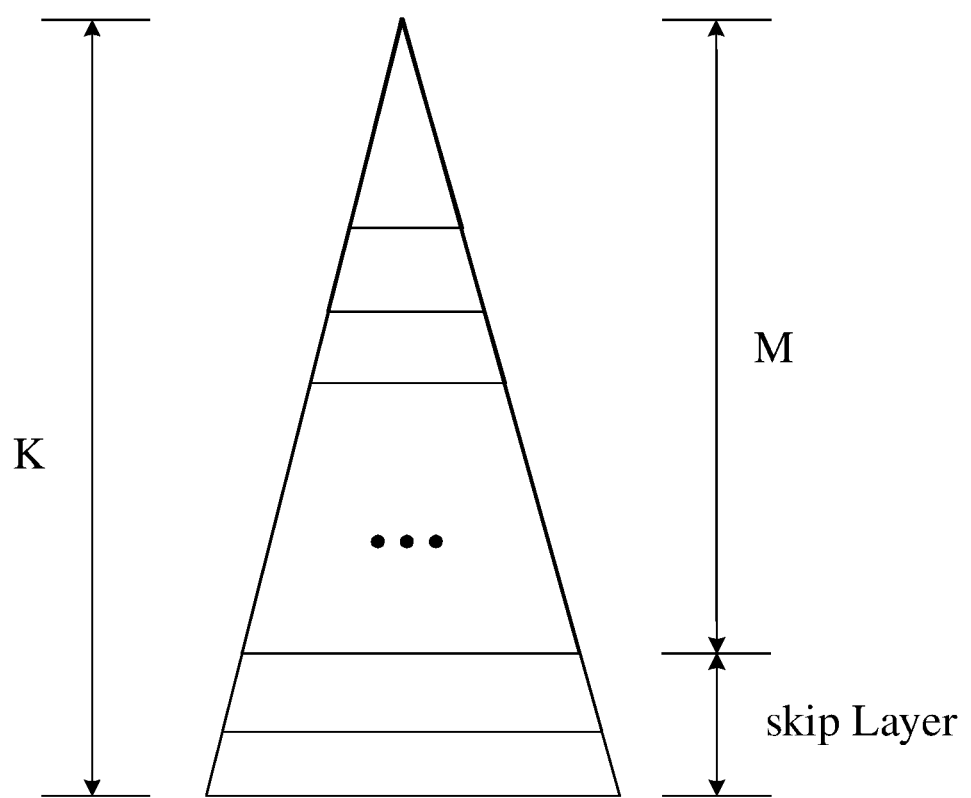
FIG. 1 is a diagram of a structure with spatial scalability according to embodiments of the disclosure.

Embodiments of the disclosure are elaborated below with reference to the drawings to allow a more thorough understanding of a feature and technical content of an embodiment here. The drawings herein are but for reference and explanation, and are not intended to limit an embodiment here.

Unless otherwise defined, all technical and scientific terms used herein have the same meanings as commonly understood by those skilled in the art of the disclosure. Terms used in the specification of the disclosure are for the mere purpose of describing a specific embodiment, and are not intended to limit the disclosure.

In the following description, "some embodiments" describe subsets of all possible embodiments. However, understandably, "some embodiments" may be the same subsets of all possible embodiments or different subsets of all possible embodiments, and may be combined with each other as long as no conflict results from the combination.

Note that in embodiments of the disclosure, a term "first\second\third" is but for differentiating similar objects, and does not denote any specific order of the objects. Understandably, when allowed, "first\second\third" in a specific order is interchangeable to allow embodiments of the disclosure described here to be implemented in an order other than one illustrated or described here.

Before embodiments of the disclosure are further elaborated, names and terms involved in embodiments of the disclosure are described and explained as follows.
1) point cloud compression (PCC)
2) geometry-based point cloud compression (G-PCC)
3) slice
4) bounding box
5) octree
6) intra prediction
7) triangle soup (trisoup)
8) context-based adaptive binary arithmetic coding (CABAC)
9) block
10) vertex
11) level of detail (LOD)
12) region adaptive hierarchal transform (RAHT)
13) skip layer
14) spatial scalability
15) moving picture experts group (MPEG)
16) international standardization organization (ISO)
17) international electrotechnical commission (IEC)
18) minimum geometry node size log 2 (MinGeomNodeSizeLog2)
19) direct point count (DirectPointCount)

Here, a point cloud is a three-dimensional representation of a surface of an object. A point cloud (data) of a surface of an object may be collected by a collect device such as a photoelectric radar, a lidar, a laser scanner, a multi-perspective camera, and/or the like.

A point cloud refers to a set of a massive number of three-dimensional points. A point in a point cloud may include location information of the point and attribute information of the point. For example, location information of a point may be information on three-dimensional coordinates of the point. Location information of a point may also be referred to as geometric information of the point. For example, attribute information of a point may include colour information and/or reflectance, and/or the like. For example, colour information may be any information in a colour space. For example, colour information may be RGB information. R denotes red. G denotes green. B denotes blue. As another example, colour information may be information on luma and chroma (YcbCr, YUV). Y denotes luma. Cb (U) denotes chromatic aberration of blue, and Cr (V) denotes chromatic aberration of red.

A point in a point cloud acquired according to a principle of laser measurement may include information on three-dimensional coordinates of the point and laser reflectance of the point. As another example, a point in a point cloud acquired according to a principle of photography measurement may include information on three-dimensional coordinates of the point and colour information of the point. As another example, a point in a point cloud acquired according to a principle combining laser measurement and photography measurement may include information on three-dimensional coordinates of the point, laser reflectance of the point, and colour information of the point.

A point cloud may be one of the following according to how the point cloud is acquired.

A point cloud of a first type is a static point cloud. That is, an object and a device used to acquire the point cloud of the object are at rest with respect to each other.

A point cloud of a second type is a moving point cloud. That is, an object is moving, but a device used to acquire the point cloud of the object is at rest.

A point cloud of a third type is a movingly acquired point cloud. That is, a device used to acquire the point cloud is moving.

For example, there may be two types of point clouds as follows, according to how a point cloud is used.

A type-1 point cloud is a point cloud sensed using a machine, and may apply to a scene such as an autonomous navigation system, a real-time patrol system, a geographic information system, a visual sorting robot, an emergency rescue and disaster relief robot, and the like.

A type-2 point cloud is a point cloud sensed by human eyes, and may apply to a scene of point cloud application such as digital cultural heritage, free viewpoint broadcast, three-dimensional immersive communication, three-dimensional immersive interaction, and the like.

As a point cloud is a set of a massive number of points, point cloud storage not only may consume a lot of memory, but also is hard to transfer, and there is not enough bandwidth that may support direct point cloud transfer at a network layer without compression. Therefore, a point cloud may have to be compressed.

So far, a point cloud coding framework that may compress a point cloud may be a video point cloud compression (V-PCC) codec framework or a geometry point cloud compression (G-PCC) codec framework provided by a moving picture experts group (MPEG), or may be an AVS-PCC codec framework provided by an audio video standard (AVS). The G-PCC codec framework may be used to compress a static point cloud of a first type, as well as a movingly acquired point cloud of a third type. The V-PCC codec framework may be used to compress a moving point cloud of a second type. The G-PCC codec framework is also known as a point cloud codec TMC13. The V-PCC codec framework is also known as a point cloud codec TMC2.

Note that in a point cloud G-PCC encoder framework, after an input point cloud has been divided into slices, the slices are coded independently. In a slice, geometric information of the point cloud and attribute information corresponding to a point in the point cloud are coded separately. First, geometric information is coded using the G-PCC encoder. Coordinate transform is performed on the geometric information using the encoder, such that all point clouds are contained within a bounding box. Then, quantification is performed, mainly for scaling. Quantification and rounding render geometric information of some of the points identical. It is decided whether to remove a duplicate point according to a parameter. Compression without point duplication removal is referred to as geometry lossless compression. Compression with point duplication removal is referred to as geometrically lossy compression. A process of quantification and point duplication removal is also referred to as voxelization. Next, the bounding box is divided based on an octree. Geometric information coding further includes two frameworks, i.e., one based on an octree and one based on a triangle soup, depending a layer depth of octree division.

In octree based geometric information coding framework, a bounding box is divided equally into 8 subcubes, and a placeholder bit of a subcube is recorded (with 1 being non-empty, and 0 being empty). A non-empty subcube continues to be divided into 8 equal parts. The division continues in general till a leaf node of 1×1×1 unit cube results. In this process, exploiting spatial correlation between a node and surrounding nodes, intra prediction is performed on a placeholder bit. Finally, arithmetic coding (CABAC) is performed, to generate a binary geometric bitstream, i.e., a geometric bitstream.

In triangle soup based geometric information coding framework, likewise, octree division is to be performed first. However, differing from octree based geometric information coding framework, the method does not require dividing the point cloud step by step into unit cubes each of a size 1×1×1. Instead, the division stops when blocks each of a size W result. Based on a surface formed by point cloud distribution in a block, up to twelve vertices generated by the surface and twelve edges of the block may be acquired. Finally, vertex coordinates of each block are coded in turn, to generate a binary geometric bitstream, i.e., a geometric bitstream.

After the G-PCC encoder has completed geometric information coding, the geometric information is reconstructed, and the attribute information of the point cloud is coded using the reconstructed geometric information. In octree based geometric information coding framework, with both geometry lossless compression and geometrically lossy compression, there may be a geometric reconstruction process upon completion of octree division. At present, point cloud attribute coding mainly includes coding colour information of a point in the point cloud. First, the encoder may perform colour space transform on the colour information of the point. For example, when colour information of a point in the input point cloud is denoted using an RGB colour space, the encoder may transform the colour information from the RGB colour space into a YUV colour space. Then, the point cloud may be recoloured using the reconstructed geometric information, such that uncoded attribute information corresponds to the reconstructed geometric information. In colour information coding, there are mainly two transform methods, one being distance based boost transform depending on LOD division, the other being direct RAHT. Both methods may transform colour information from a spatial domain into a frequency domain, to obtain a high-frequency coefficient and a low-frequency coefficient. Finally, quantification and arithmetic coding are performed on the coefficients, to generate a binary attribute bitstream, i.e., an attribute bitstream.

In a point cloud G-PCC decoder framework, an attribute bitstream corresponding to a point in a point cloud and a geometric bitstream of the point cloud may be decoded separately. The G-PCC decoder decodes the geometric bitstream. The decoder performs arithmetic decoding on the geometric bitstream, to obtain the bounding box of the point cloud and octree based placeholder bits (with 1 being non-empty, and 0 being empty). Geometric information decoding further includes two frameworks, i.e., one based on an octree and one based on a triangle soup, depending a layer depth of octree division in coding.

Here, spatial scalability is an important function of G-PCC. A point cloud thumbnail is generated by decoding bitstream information of some point clouds, which presently applies just to a G-PCC decoder framework based on octree geometric information. A skip layer may be an octree layer lacking decoding by the decoder. FIG. 1 is a diagram of a structure with spatial scalability according to an example embodiment of the disclosure. In FIG. 1, the octree geometry coding reaches a K-th layer. In this case, if the decoder performs no decoding of a spatial scalability process, the K layers will be decoded fully. If the decoder performs part decoding in a scalability process, then decoding ends when M layers are decoded (M=K−skip layer). The skip layer denotes any octree layer that does not have to be decoded.

Note that the spatial scalability function is controlled by a parameter scalable_lifting_enabled_flag. A scalable_lifting_enabled_flag=0 denotes that the spatial scalability function is not performed. A scalable_lifting_enabled_flag=1 denotes that the spatial scalability function is performed.

In octree based geometric information decoding framework, a maximum cubical box of the current point cloud in space is calculated according to the bounding box. Then, a non-empty subcube continues to be divided into 8 equal parts according to a placeholder bit. The division continues in general till a leaf node of 1×1×1 unit cube results. However, if the spatial scalability function is performed during decoding, the division stops at a designated skip layer, generating a $2^{skipLayer} \times 2^{skipLayer} \times 2^{skipLayer}$ cube. Then, geometric coordinate information is generated using the cube. Here, geometric coordinates of a leaf node of 1×1×1 unit cube are coordinates of the front left lower corner of the cube. Geometric coordinates of a leaf node of $2^{skipLayer} \times 2^{skipLayer} \times 2^{skipLayer}$ unit cube are determined using a reconstruction strategy according to a skip layer.

Figure 2:
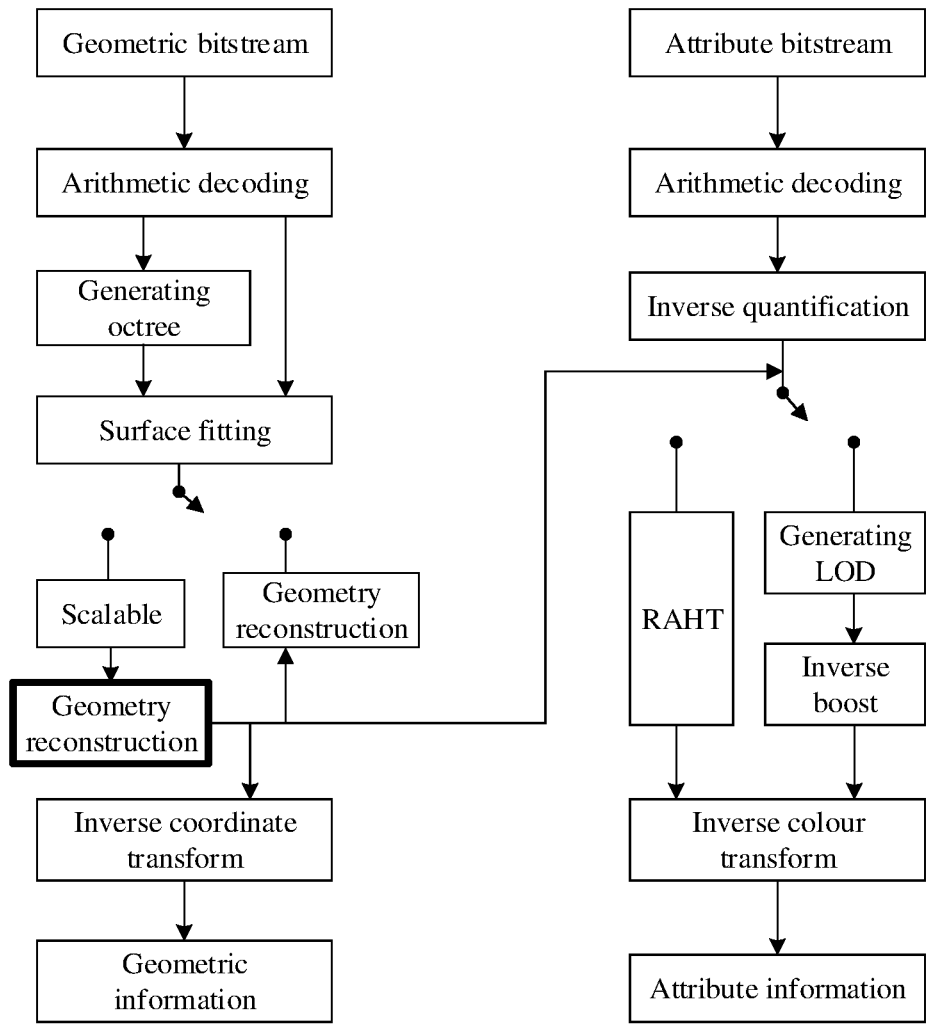
FIG. 2 is a diagram of composition of a framework of a G-PCC decoder according to embodiments of the disclosure.

Illustratively, FIG. 2 is a diagram of a framework of a G-PCC decoder according to an example embodiment of the disclosure. In FIG. 2, after a binary bitstream has been acquired, a geometric bitstream and an attribute bitstream in the binary bitstream are decoded independently. In decoding the geometric bitstream, geometric information of a point cloud is acquired via arithmetic decoding-octree synthesis-surface fitting-geometry reconstruction-inverse coordinate transform. Here, following the operation of surface fitting, it is optional to perform geometry reconstruction, or to perform scalable-geometry reconstruction, mainly depending on whether the spatial scalability function is performed. In decoding the attribute bitstream, attribute information of the point cloud is acquired via arithmetic decoding-inverse quantification-LOD based inverse boost or RAHT based inverse transform-inverse colour transform. A three-dimensional picture model of point cloud data to be coded is restored based on the geometric information and the attribute information.

However, in present related art, an existing method of scalable coding geometry reconstruction was proposed January, 2020, and received as an MPEG G-PCC standard, i.e., MPEG-I (ISO/IEC 23090) Part 9. According to the technical solution, different reconstruction strategies are adopted depending on different skip layers. Specifically, taking FIG. 3 as an example, the decoder is implemented as follows.

Figure 3:
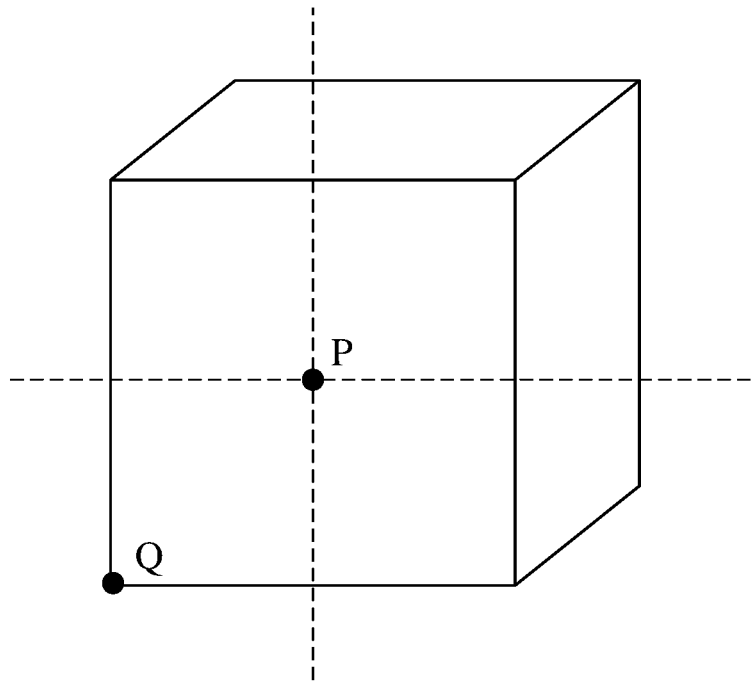
FIG. 3 is a diagram of adopting a reconstruction strategy based on a skip layer according to embodiments of the disclosure.

When the skip layer=1, the geometric coordinates may be coordinate information of the front left lower corner of the cube, as shown by the location of the point Q in FIG. 3.

When the skip layer>1, the geometric coordinates may be coordinate information of the center of the cube, as shown by the location of the point P in FIG. 3.

See MPEG G-PCC standard, appendix C for the technical solution. In octree based geometric information decoding framework, when MinGeomNodeSizeLog2 is greater than 1, location shift in decoding of a slice of a current point cloud picture is as follows.

```
mask = (−1) << MinGeomNodeSizeLog2
for( i = 0; i < PointCount ; i++) {
    PointPos[i][0] = (PointPos[i][0] & mask) + (1 << (MinGeomNodeSizeLog2−
```

-continued

```
1 ) )
    PointPos[i][1] = (PointPos[i][1] & mask) + (1 << (MinGeomNodeSizeLog2-
1 ) )
    PointPos[i][2] = (PointPos[i][2] & mask) + (1 << (MinGeomNodeSizeLog2-
1 ) )
  }
```

Here, MinGeomNodeSizeLog2 denotes the minimum node size of the current octree, with a numerical value equal to the skip layer. PointCount denotes a total number of nodes when decoding of a current slice reaches the layer MinGeomNodeSizeLog2. PointPos[i][0] denotes the x-axis coordinate of a reconstructed geometric point of a current node. PointPos[i][1] denotes the y-axis coordinate of the reconstructed geometric point of the current node. PointPos[i] [2] denotes the z-axis coordinate of the reconstructed geometric point of the current node. The mask denotes an intermediate mask.

Note that initial values of PointPos[i][0], PointPos[i][1], and PointPos[i][2] may be coordinates of the front left lower corner of a current node cube of a size MinGeomNodeSizeLog2, i.e., as shown by the location coordinates of the point Q in FIG. 3. After being shifted by the codes, the values of PointPos[i][0], PointPos[i][1], and PointPos[i][2] may equal coordinates of the center of the current node cube, i.e., as shown by the location coordinates of the point P in FIG. 3.

Further note that just some of the geometric bitstream information is decoded, and all points within the spatial range of a node of a size of the skip layer are represented by one geometric point within the space of the node. Therefore, geometry reconstruction after spatial scalability is a process with a loss. With present G-PCC, the magnitude of a geometric error in the process is measured in two modes as follows.

Figure 4:
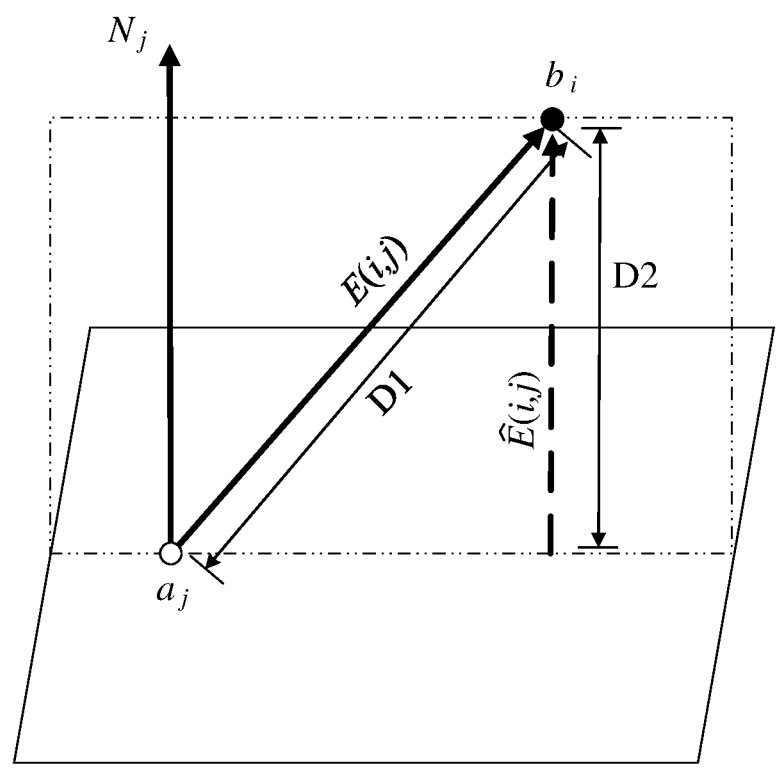
FIG. 4 is a diagram of a structure of point-to-point error measurement according to embodiments of the disclosure.

In the first mode, the geometric error may be denoted by a point-to-point distance. Here, measurement of the point-to-point geometric error is calculated as shown in FIG. 4. In FIG. 4, a black point ($b_i$) may be a point generated by scalable coding of the point cloud. A white point ($a_j$) may be a point in the raw point cloud which is closest to the black point. The difference between coordinates of the black point and the white point is a point-to-point error vector, which may be denoted by $E(i,j)=b_i-a_j$. The length of the error vector is the point-to-point geometric error, i.e., $e_{B,A}^{D1}(i)=\|E(i,j)\|_2^2$. B is a sparse point cloud that has undergone scalable coding. A is the raw point cloud. According to point-to-point distances $e_{B,A}^{D1}(i)$ of all points $i \in B$, with $N_B$ being a point count in the point cloud B, the point-to-point error D1 of the entire point cloud may be calculated, as shown by formula (1).

$$e_{B,A}^{D1} = \frac{1}{N_B} \Sigma_{\forall b_i \in B} e_{B,A}^{D1}(i) \qquad (1)$$

In the second mode, the geometric error may be denoted by a point-to-plane distance. Here, as shown in FIG. 4, a new error vector $\tilde{E}(i,j)$ is acquired by projecting the error vector $E(i,j)$ along a normal $N_j$. Thus, the point-to-plane error D2 may be calculated, as shown by formula (2).

$$e_{B,A}^{D2}(i) = \|\tilde{E}(i,j)\|_2^2 = \frac{N_j \cdot E(i,j)}{\|N_j\|} \qquad (2)$$

$\|N_j\|$ denotes use of a norm L1. The norm L1 is the sum of absolute values of corresponding vectors, as shown by formula (3). $\|E(i,j)\|_2$ denotes use of a norm L2. The norm L2 is the square root of the sum of square terms of corresponding vectors, as shown by formula (4).

$$\|x\|=|x_1|+|x_2|+|x_3|+ \ldots +|x_n| \qquad (3)$$

$$\|x\|_2=(|x_1|^2+|x_2|^2+|x_3|^2+ \ldots +|x_n|^2)^{1/2} \qquad (4)$$

In existing geometry reconstruction after spatial scalability, the same method for geometry reconstruction is adopted for all nodes of the skip layer. For example, when the skip layer=1, all node geometric coordinates are coordinate information of the front left lower corner of a node cube. When the skip layer>1, all node geometric coordinates are coordinate information of the center of a node cube. The closer the numerical values of geometric coordinates of a node are to average coordinates of all points within the node, the less the measurement of the point-to-point error. The farther away the numerical values of geometric coordinates of a node are to average coordinates of all points within the node, the greater the measurement of the point-to-point error. However, with an existing technical solution, different point distributions inside different nodes are not taken into account. If average coordinates of all points within a current node (i.e., a node under consideration) far away from the center and the front left lower corner of the cube, then with the existing technical solution, a geometric error in geometry reconstruction after spatial scalability may be increased.

An embodiment of the disclosure provides a method for geometry reconstruction. A neighbouring node of a current node is determined based on location information of the current node. A factor of impact of the neighbouring node in direction along a preset axis on the current node is determined based on attribute information of the neighbouring node. A weight of the neighbouring node of the current node is determined. Coordinates of the current node after geometry reconstruction are determined based on the weight of the neighbouring node and the factor of impact of the neighbouring node in direction along the preset axis on the current node. Thus, by making the most of spatial correlation of a point cloud while allocating a weight to a neighbouring node according to extent of contact between the neighbouring node and the current node under consideration, numerical values of calculated coordinates after geometry reconstruction are made closer to average coordinates of all points within the current node, thereby reducing a geometric error in geometry reconstruction after spatial scalability.

Note that a method for geometry reconstruction according to embodiments of the disclosure applies to a video decoding device, i.e., a G-PCC decoder, or a decoder for short. A function implemented by the method may be implemented by a processor in a decoder through calling a computer program. Of course, the computer program may be stored in a memory. It is seen that a decoder includes at least a processor and a memory.

Figure 5:
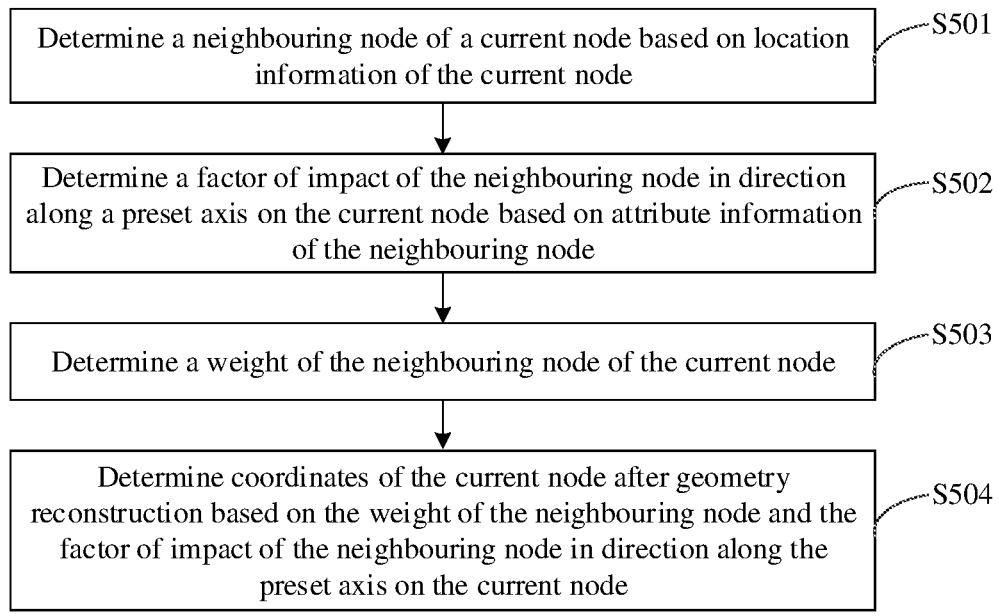
FIG. 5 is a flowchart of a method for geometry reconstruction according to embodiments of the disclosure.

In an embodiment of the disclosure, referring to FIG. 5, which shows a flowchart of a method for geometry reconstruction according to embodiments of the disclosure. As shown in FIG. 5, the method may include operations S501 to S504 as follows.

In S501, a neighbouring node of a current node is determined based on location information of the current node.

Here, points in a point cloud may be all points in the point cloud, or may be some points in the point cloud. These points are relatively concentrated in space.

Further note that based on the framework of a G-PCC decoder as shown in FIG. 2, a method according to embodiments of the disclosure mainly applies to a "geometry reconstruction" part identified by the thick box, and optimizes geometry reconstruction after spatial scalability in present related art, so as to boost extent of use of spatial correlation.

Note that it may be determined, by flag information in a decoder, whether a spatial scalability function is to be performed in octree decoding. In some embodiments, the flag information may be enabled flag information, to prevent the flag from being modified in reserve. The enabled flag information may specifically refer to spatial scalability enabled flag information (denoted by a scalable_lifting_enabled_flag). The value of the spatial scalability enabled flag information may be obtained by parsing a bitstream. Specifically, in some embodiments, the method may include operations as follows.

Spatial scalability enabled flag information may be obtained by parsing a bitstream.

The operation of determining the neighbouring node of the current node based on the location information of the current node may be implemented when the spatial scalability enabled flag information indicates not to decode a skip layer containing the current node.

That is, after spatial scalability enabled flag information has been obtained by parsing a bitstream, it may be determined whether a spatial scalability function is to be performed based on the spatial scalability enabled flag information. A method for geometry reconstruction according to embodiments of the disclosure is not implemented unless the spatial scalability enabled flag information indicates that a spatial scalability function is to be performed, i.e., that a skip layer containing the current node is not to be decoded.

Further, for spatial scalability enabled flag information, in some embodiments, the method may further include operations as follows.

If the spatial scalability enabled flag information has a first value, it may be determined that the spatial scalability enabled flag information indicates to decode the skip layer containing the current node.

If the spatial scalability enabled flag information has a second value, it may be determined that the spatial scalability enabled flag information indicates not to decode the skip layer containing the current node.

In a specific example, the first value is 0, and the second value is 1; or the first value is false, and the second value is true.

Illustratively, taking the first value being 0 and the second value being 1 as an example, if the scalable_lifting_enabled_flag has a value of 0, then the spatial scalability function is not performed. That is, complete octree decoding is performed. In other words, in this case, the skip layer containing the current node is decoded. If the scalable_lifting_enabled_flag has a value of 1, then the spatial scalability function is performed. That is, octree decoding is performed in part. In other words, in this case, the skip layer containing the current node is not decoded. It is in this case that a method for geometry reconstruction according to embodiments of the disclosure is implemented.

Further note that in S501, determining the neighbouring node of the current node may include at least one of determining a surface sharing neighbouring node neighbouring the current node at a surface, determining an edge sharing neighbouring node neighbouring the current node at an edge, or determining a vertex sharing neighbouring node neighbouring the current node at a vertex.

Figure 6:
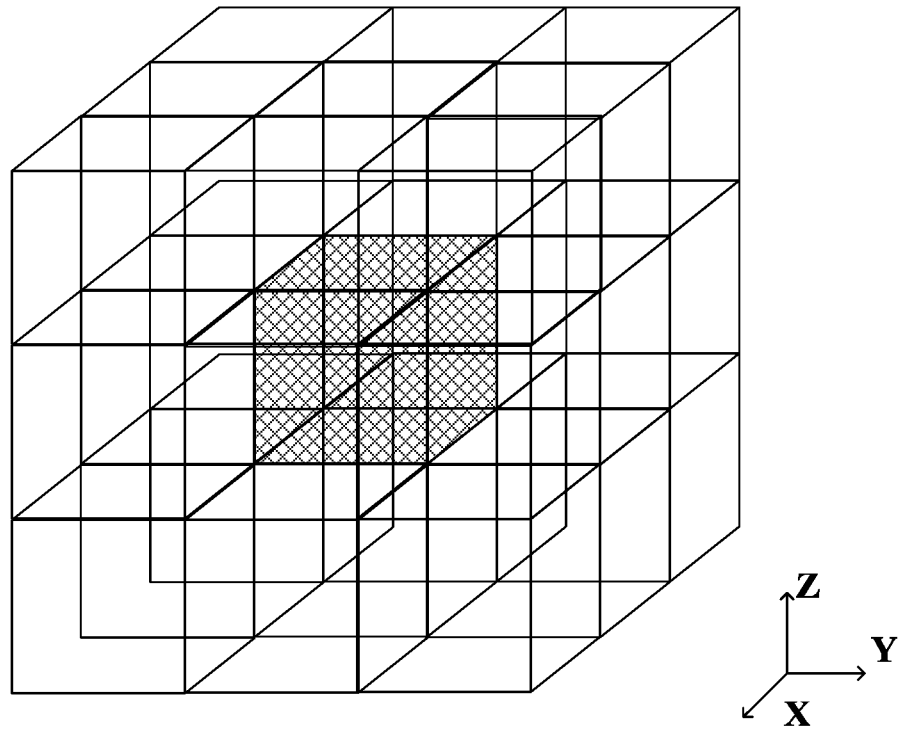
FIG. 6 is a diagram of relation among locations of a current node and neighbouring nodes according to embodiments of the disclosure.

That is, in case octree decoding is performed in part, in general there may be 26 neighbouring nodes surrounding the current node in the skip layer, specifically as shown in FIG. 6. In FIG. 6, the point filled with grey denotes the current node, which is surrounded by 26 neighbouring nodes, of which there are 6 surface sharing neighbouring nodes, 12 edge sharing neighbouring nodes (also known as "line sharing neighbouring nodes"), and the 8 vertex sharing neighbouring nodes.

In embodiments of the disclosure, the neighbouring node determined here may be all of the 26 neighbouring nodes, or may be just the 6 surface sharing neighbouring nodes, or may be just the 6 surface sharing neighbouring nodes and the 12 edge sharing neighbouring nodes, or may even be another number of neighbouring nodes, which is not limited by embodiments of the disclosure.

Further, after the neighbouring node of the current node has been determined, the attribute information of the neighbouring node may further be obtained. Here, the attribute information of the neighbouring node may include a type of the neighbouring node. The type of the neighbouring node may include at least one of a surface sharing neighbouring node sharing a surface with the current node, an edge sharing neighbouring node sharing an edge with the current node, or a vertex sharing neighbouring node sharing a vertex with the current node.

In some embodiments, the current node has 6 surface sharing neighbouring nodes, 12 edge sharing neighbouring nodes, and 8 vertex sharing neighbouring nodes.

In other words, with embodiments of the disclosure, the 26 neighbouring nodes may be taken as a search range of the current node; or part of the neighbouring nodes (such as just the 6 surface sharing neighbouring nodes, or just the 6 surface sharing neighbouring nodes and the 12 edge sharing neighbouring nodes, or even a neighbouring node combination of another type, etc.) may be taken as the search range of the current node, which is not limited hereto.

In S502, a factor of impact of the neighbouring node in direction along a preset axis on the current node is determined based on attribute information of the neighbouring node.

In embodiments of the disclosure, as extent of contact between a neighbouring node and the current node may differ, a factor of impact of the neighbouring node in direction along a preset axis on the current node may be determined based on attribute information of the neighbouring node. In addition, a preset axis direction may be along a horizontal axis (X-axis), or may be along a vertical axis (Y-axis), or may be along a third axis (Z-axis), which is not limited hereto.

Specifically, determination of the factor of impact of a neighbouring node in direction along a preset axis on the current node may further be related to coordinate information of the center of the current node. In some embodiments, in S502, the factor of impact of the neighbouring node in direction along the preset axis on the current node may be determined based on the attribute information of the neighbouring node as follows.

Coordinate information of a center of the current node may be determined.

The factor of impact of the neighbouring node in direction along the preset axis on the current node may be determined based on the coordinate information of the center and the attribute information of the neighbouring node.

Note that taking the search range of the 26 neighbouring nodes as an example, assuming that the coordinate information of the center is denoted by $(x_0, y_0, z_0)$, a factor of impact of a neighbouring node on the current node with center coordinate information $(x_0, y_0, z_0)$, in direction along a preset axis, is determined, and may specifically include a factor of impact of a surface sharing neighbouring node, a factor of impact of an edge sharing neighbouring node, and a factor of impact of a vertex sharing neighbouring node.

Further, in some embodiments, the factor of impact of the neighbouring node in direction along the preset axis on the current node may be determined based on the coordinate information of the center and the attribute information of the neighbouring node, as follows.

When the attribute information of the neighbouring node indicates that the neighbouring node includes the surface sharing neighbouring node, a factor of impact of the surface sharing neighbouring node in direction along the preset axis on the current node may be determined based on the coordinate information of the center of the current node and the surface sharing neighbouring node.

When the attribute information of the neighbouring node indicates that the neighbouring node includes the edge sharing neighbouring node, a factor of impact of the edge sharing neighbouring node in direction along the preset axis on the current node may be determined based on the coordinate information of the center of the current node and the edge sharing neighbouring node.

When the attribute information of the neighbouring node indicates that the neighbouring node includes the vertex sharing neighbouring node, a factor of impact of the vertex sharing neighbouring node in direction along the preset axis on the current node may be determined based on the coordinate information of the center of the current node and the vertex sharing neighbouring node.

Further note that if a search range of neighbouring nodes contains the surface sharing neighbouring nodes, the edge sharing neighbouring nodes, and the vertex sharing neighbouring nodes, it means that the neighbouring node here refers to the 26 neighbouring nodes surrounding the current node, specifically as shown in FIG. 6. In this case, with embodiments of the disclosure, point existence information of these neighbouring nodes is further determined. In some embodiments, determining the factor of impact of the neighbouring node in direction along the preset axis on the current node may include determining whether the neighbouring node contains a point.

Note that in embodiments of the disclosure, the decoder may determine whether the neighbouring node contains a point using the bitstream in the decoder, so as to determine the factor of impact of the neighbouring node in direction along the preset axis on the current node.

Thus, at the decoder side, with embodiments of the disclosure, a preset function $g(x_i, y_i, z_i)$ may be used to denote point existence within the range $$x \in (x_i - \frac{L}{2}, x_i + \frac{L}{2}), y \in (y_i - \frac{L}{2}, y_i + \frac{L}{2}), z \in (z_i - \frac{L}{2}, z_i + \frac{L}{2}).$$

L denotes the node size corresponding to a skip layer when the decoder performs spatial scalability decoding. $L = 2^{skip\ layer}$.

In a specific example, if point existence within the range is true (that is, "the range contains a point"), then the value of the function $g(x_i, y_i, z_i)$ equals 1. If point existence within the range is false (that is, "the range contains no point"), then the value of the function $g(x_i, y_i, z_i)$ equals 0.

Thus, the preset function may be used to denote the point existence information of the 26 neighbouring nodes, to determine the value of the function of a surface sharing neighbouring node, the value of the function of an edge sharing neighbouring node, and the value of the function of a vertex sharing neighbouring node, to further determine a factor of impact of a surface sharing neighbouring node, a factor of impact of an edge sharing neighbouring node, and a factor of impact of a vertex sharing neighbouring node in direction along the preset axis on the current node.

In some embodiments, the factor of impact of a surface sharing neighbouring node in direction along the preset axis on the current node may be determined based on the coordinate information of the center and the surface sharing neighbouring node, as follows.

The value of the function of a surface sharing neighbouring node may be determined.

The factor of impact of the surface sharing neighbouring node in direction along the preset axis on the current node may be determined using a first computational model based on the coordinate information of the center and the value of the function of the surface sharing neighbouring node.

In a specific example, the value of the function of the surface sharing neighbouring node may be determined as follows.

It may be determined whether the surface sharing neighbouring node contains a point.

The value of the function of the surface sharing neighbouring node may be determined as 1 if the surface sharing neighbouring node contains a point.

The value of the function of the surface sharing neighbouring node may be determined as 0 if the surface sharing neighbouring node contains no point.

In embodiments of the disclosure, assuming that the coordinate information of the center of the current node is denoted by $(x_0, y_0, z_0)$, the factor of impact of the surface sharing neighbouring node in direction along the X-axis on the current node is denoted by $b_{1x}$, the factor of impact of the surface sharing neighbouring node in direction along the Y-axis on the current node is denoted by $b_{1y}$, and the factor of impact of the surface sharing neighbouring node in direction along the Z-axis on the current node is denoted by $b_{1z}$. In this case, the first computational model is as follows.

$$b_{1x} = g(x_0+L, y_0, z_0)(x_0+L) - g(x_0-L, y_0, z_0)(x_0-L) \quad (5)$$

$$b_{1y} = g(x_0, y_0+L, z_0)(y_0+L) - g(x_0, y_0-L, z_0)(y_0-L) \quad (6)$$

$$b_{1z} = g(x_0, y_0, z_0+L)(z_0+L) - g(x_0, y_0, z_0-L)(z_0-L) \quad (7)$$

The 6 preset functions $g(x_0+L, y_0, z_0)$, $g(x_0-L, y_0, z_0)$, $g(x_0, y_0+L, z_0)$, $g(x_0, y_0-L, z_0)$, $g(x_0, y_0, z_0+L)$, and $g(x_0, y_0, z_0-L)$ may be configured to indicate whether the 6 surface sharing neighbouring nodes contain a point, respectively. The factor of impact of a surface sharing neighbouring node in direction along a preset axis on the current node may be calculated according to formulas (5), (6), and (7). The preset axis may be an X-axis, a Y-axis, as well as a Z-axis.

Further, as results obtained using formulas (5), (6), and (7) are scalars, in some embodiments, the method may further include an operation as follows.

The absolute value of the factor of impact of the surface sharing neighbouring node may be calculated, and be determined as the factor of impact of the surface sharing neighbouring node.

That is, the factor of impact of the surface sharing neighbouring node in direction along the X-axis on the current node may be $|b_{1x}|$, the factor of impact of the surface sharing neighbouring node in direction along the Y-axis on the current node may be $|b_{1y}|$, and the factor of impact of the surface sharing neighbouring node in direction along the Z-axis on the current node may be $|b_{1z}|$.

In some embodiments, the factor of impact of an edge sharing neighbouring node in direction along the preset axis on the current node may be determined based on the coordinate information of the center and the edge sharing neighbouring node, as follows.

The value of the function of an edge sharing neighbouring node may be determined.

The factor of impact of the edge sharing neighbouring node in direction along the preset axis on the current node may be determined using a second computational model based on the coordinate information of the center and the value of the function of the edge sharing neighbouring node.

In a specific example, the value of the function of the edge sharing neighbouring node may be determined as follows.

It may be determined whether the edge sharing neighbouring node contains a point.

The value of the function of the edge sharing neighbouring node may be determined as 1 if the edge sharing neighbouring node contains a point.

The value of the function of the edge sharing neighbouring node may be determined as 0 if the edge sharing neighbouring node contains no point.

In embodiments of the disclosure, assuming that the coordinate information of the center of the current node is denoted by $(x_0, y_0, z_0)$, the factor of impact of the edge sharing neighbouring node in direction along the X-axis on the current node is denoted by $b_{2x}$, the factor of impact of the edge sharing neighbouring node in direction along the Y-axis on the current node is denoted by $b_{2y}$, and the factor of impact of the edge sharing neighbouring node in direction along the Z-axis on the current node is denoted by $b_{2z}$. In this case, the second computational model is as follows.

$$b_{2x} = \begin{pmatrix} g(x_0+L, y_0, z_0-L) \\ g(x_0+L, y_0, z_0+L) \\ g(x_0+L, y_0-L, z_0) \\ g(x_0+L, y_0+L, z_0) \end{pmatrix}(x_0+L) - \begin{pmatrix} g(x_0-L, y_0, z_0-L) \\ g(x_0-L, y_0-L, z_0) \\ g(x_0-L, y_0, z_0+L) \\ g(x_0-L, y_0+L, z_0) \end{pmatrix}(x_0-L) \quad (8)$$

$$b_{2y} = \begin{pmatrix} g(x_0, y_0+L, z_0+L) \\ g(x_0+L, y_0+L, z_0) \\ g(x_0-L, y_0+L, z_0) \\ g(x_0, y_0+L, z_0-L) \end{pmatrix}(y_0+L) - \begin{pmatrix} g(x_0, y_0-L, z_0+L) \\ g(x_0+L, y_0-L, z_0) \\ g(x_0-L, y_0-L, z_0) \\ g(x_0, y_0-L, z_0-L) \end{pmatrix}(y_0-L) \quad (9)$$

$$b_{2z} = \begin{pmatrix} g(x_0, y_0-L, z_0+L) \\ g(x_0+L, y_0, z_0+L) \\ g(x_0-L, y_0, z_0+L) \\ g(x_0, y_0+L, z_0+L) \end{pmatrix}(z_0+L) - \begin{pmatrix} g(x_0, y_0-L, z_0-L) \\ g(x_0+L, y_0, z_0-L) \\ g(x_0-L, y_0, z_0-L) \\ g(x_0, y_0+L, z_0-L) \end{pmatrix}(z_0-L) \quad (10)$$

The 12 preset functions $g(x_0+L, y_0, z_0-L)$, $g(x_0+L, y_0, z_0+L)$, $g(x_0+L, y_0-L, z_0)$, $g(x_0+L, y_0+L, z_0)$, $g(x_0-L, y_0, z_0-L)$, $g(x_0-L, y_0-L, z_0)$, $g(x_0-L, y_0, z_0+L)$, $g(x_0-L, y_0+L, z_0)$, $g(x_0, y_0+L, z_0+L)$, $g(x_0, y_0+L, z_0-L)$, $g(x_0, y_0-L, z_0+L)$, and $g(x_0, y_0-L, z_0-L)$ may be configured to indicate whether the 12 edge sharing neighbouring nodes contain a point, respectively. The factor of impact of an edge sharing neighbouring node in direction along a preset axis on the current node may be calculated according to formulas (8), (9), and (10). The preset axis may be an X-axis, a Y-axis, as well as a Z-axis.

Further, as results obtained using formulas (8), (9), and (10) are vectors, in some embodiments, the method may further include an operation as follows.

The norm of the factor of impact of the edge sharing neighbouring node may be calculated, and be determined as the factor of impact of the edge sharing neighbouring node.

That is, the factor of impact of the edge sharing neighbouring node in direction along the X-axis on the current node may be $\|b_{2x}\|$, the factor of impact of the edge sharing neighbouring node in direction along the Y-axis on the current node may be $\|b_{2y}\|$ and the factor of impact of the edge sharing neighbouring node in direction along the Z-axis on the current node may be $\|b_{2z}\|$.

In some embodiments, the factor of impact of a vertex sharing neighbouring node in direction along the preset axis on the current node may be determined based on the coordinate information of the center and the vertex sharing neighbouring node, as follows.

The value of the function of a vertex sharing neighbouring node may be determined.

The factor of impact of the vertex sharing neighbouring node in direction along the preset axis on the current node may be determined using a third computational model based on the coordinate information of the center and the value of the function of the vertex sharing neighbouring node.

In a specific example, the value of the function of the vertex sharing neighbouring node may be determined as follows.

It may be determined whether the vertex sharing neighbouring node contains a point.

The value of the function of the vertex sharing neighbouring node may be determined as 1 if the vertex sharing neighbouring node contains a point.

The value of the function of the vertex sharing neighbouring node may be determined as 0 if the vertex sharing neighbouring node contains no point.

In embodiments of the disclosure, assuming that the coordinate information of the center of the current node is denoted by $(x_0, y_0, z_0)$, the factor of impact of the vertex sharing neighbouring node in direction along the X-axis on the current node is denoted by $b_{3x}$, the factor of impact of the vertex sharing neighbouring node in direction along the Y-axis on the current node is denoted by $b_{3y}$, and the factor of impact of the vertex sharing neighbouring node in direction along the Z-axis on the current node is denoted by $b_{3z}$. In this case, the third computational model is as follows.

$$b_{3x} = \begin{pmatrix} g(x_0+L, y_0+L, z_0-L) \\ g(x_0+L, y_0-L, z_0-L) \\ g(x_0+L, y_0-L, z_0+L) \\ g(x_0+L, y_0+L, z_0+L) \end{pmatrix}(x_0+L) - \begin{pmatrix} g(x_0-L, y_0+L, z_0-L) \\ g(x_0-L, y_0-L, z_0-L) \\ g(x_0-L, y_0-L, z_0+L) \\ g(x_0-L, y_0+L, z_0+L) \end{pmatrix}(x_0-L) \quad (11)$$

$$b_{3y} = \begin{pmatrix} g(x_0+L, y_0+L, z_0-L) \\ g(x_0+L, y_0+L, z_0-L) \\ g(x_0-L, y_0+L, z_0+L) \\ g(x_0-L, y_0+L, z_0+L) \end{pmatrix}(y_0+L) - \quad (12)$$

-continued $$b_{3z} = \begin{pmatrix} g(x_0+L, y_0-L, z_0-L) \\ g(x_0+L, y_0-L, z_0-L) \\ g(x_0-L, y_0-L, z_0+L) \\ g(x_0-L, y_0-L, z_0+L) \end{pmatrix}(y_0-L)$$

$$+ \begin{pmatrix} g(x_0-L, y_0+L, z_0+L) \\ g(x_0-L, y_0-L, z_0+L) \\ g(x_0+L, y_0-L, z_0+L) \\ g(x_0+L, y_0+L, z_0+L) \end{pmatrix}(z_0+L) - \quad (13)$$

$$\begin{pmatrix} g(x_0-L, y_0+L, z_0-L) \\ g(x_0-L, y_0-L, z_0-L) \\ g(x_0+L, y_0-L, z_0-L) \\ g(x_0+L, y_0+L, z_0-L) \end{pmatrix}(z_0-L)$$

The 8 preset functions $g(x_0+L, y_0+L, z_0-L)$, $g(x_0+L, y_0-L, z_0-L)$, $g(x_0+L, y_0-L, z_0+L)$, $g(x_0+L, y_0+L, z_0+L)$, $g(x_0-L, y_0+L, z_0-L)$, $g(x_0-L, y_0-L, z_0-L)$, $g(x_0-L, y_0-L, z_0+L)$, and $g(x_0-L, y_0+L, z_0+L)$ may be configured to indicate whether the 8 vertex sharing neighbouring nodes contain a point, respectively. The factor of impact of a vertex sharing neighbouring node in direction along a preset axis on the current node may be calculated according to formulas (11), (12), and (13). The preset axis may be an X-axis, a Y-axis, as well as a Z-axis.

Further, as results obtained using formulas (11), (12), and (13) are vectors, in some embodiments, the method may further include an operation as follows.

The norm of the factor of impact of the vertex sharing neighbouring node may be calculated, and be determined as the factor of impact of the vertex sharing neighbouring node.

That is, the factor of impact of the vertex sharing neighbouring node in direction along the X-axis on the current node may be $\|b_{3x}\|$, the factor of impact of the vertex sharing neighbouring node in direction along the Y-axis on the current node may be $\|b_{3y}\|$, and the factor of impact of the vertex sharing neighbouring node in direction along the Z-axis on the current node may be $\|b_{3z}\|$.

Thus, taking the search range of the 26 neighbouring nodes as an example, the factor of impact of the surface sharing neighbouring node in direction along the X-axis on the current node with center coordinate information $(x_0, y_0, z_0)$ may be $|b_{1x}|$, the factor of impact of the surface sharing neighbouring node in direction along the Y-axis on the current node may be $|b_{1y}|$, and the factor of impact of the surface sharing neighbouring node in direction along the Z-axis on the current node may be $|b_{1z}|$. The factor of impact of the edge sharing neighbouring node in direction along the X-axis on the current node may be $\|b_{2x}\|$, the factor of impact of the edge sharing neighbouring node in direction along the Y-axis on the current node may be $\|b_{2y}\|$, and the factor of impact of the edge sharing neighbouring node in direction along the Z-axis on the current node may be $\|b_{2z}\|$. The factor of impact of the vertex sharing neighbouring node in direction along the X-axis on the current node may be $\|b_{3x}\|$, the factor of impact of the vertex sharing neighbouring node in direction along the Y-axis on the current node may be $\|b_{3y}\|$, and the factor of impact of the vertex sharing neighbouring node in direction along the Z-axis on the current node may be $\|b_{3z}\|$.

In S503, a weight of the neighbouring node of the current node is determined.

Figure 7:
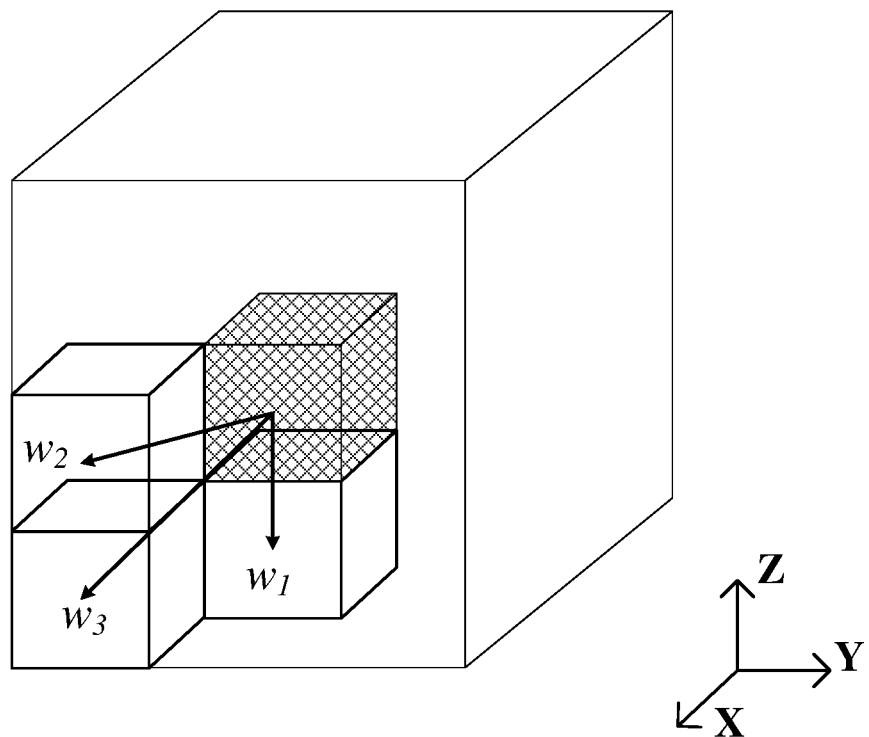
FIG. 7 is another diagram of relation among locations of a current node and neighbouring nodes according to embodiments of the disclosure.

Note that taking the search range of the 26 neighbouring nodes as an example, according to the extent of contact with the current node, a neighbouring relation may be divided into neighbouring at a surface, neighbouring at an edge, and neighbouring at a vertex. Therefore, a neighbouring node may be of a type of a surface sharing neighbouring node, an edge sharing neighbouring node, or a vertex sharing neighbouring node. As shown in FIG. 7, the cube filled with grey denotes the current node. A cube node W1 shares a common surface with the current node in direction along the Z-axis. So, the cube node W1 and the current node are neighbouring at a surface, in direction along the Z-axis. The cube node W1 may be referred to as a surface sharing neighbouring node. A cube node W2 shares a common edge with the current node in direction along X-Y. The cube node W2 and the current node are neighbouring at an edge, in direction along X-Y. So, the cube node W2 may be referred to as an edge sharing neighbouring node. A cube node W3 shares a common vertex with the current node in direction along X-Y-Z. The cube node W3 and the current node are neighbouring at a vertex in direction along X-Y-Z. So, the cube node W3 may be referred to as a vertex sharing neighbouring node. Here, neighbouring at a surface does not count as neighbouring at an edge and does not count as neighbouring at a vertex, and neighbouring at an edge does not count as neighbouring at a vertex. With embodiments of the disclosure, different weights may be adopted respectively for a neighbouring node neighbouring at a surface, a neighbouring node neighbouring at an edge, and a neighbouring node neighbouring at a vertex (i.e., a surface sharing neighbouring node, an edge sharing neighbouring node, and a vertex sharing neighbouring node).

In some embodiments, in S503, the weight of the neighbouring node of the current node may be determined as follows.

A preset ratio among the weight of the surface sharing neighbouring node, the weight of the edge sharing neighbouring node of the current mode, and the weight of the vertex sharing neighbouring node may be determined based on distances from the current node to the surface sharing neighbouring node, the edge sharing neighbouring node, and the vertex sharing neighbouring node.

A normalized coefficient may be obtained by normalizing the preset ratio.

The weight of the vertex sharing neighbouring node, the weight of the edge sharing neighbouring node, and the weight of the surface sharing neighbouring node of the current node may be determined based on the normalized coefficient and the preset ratio.

An embodiment of the disclosure may be an improvement based on point-to-point error measurement. The weight of a surface sharing neighbouring node, the weight of an edge sharing neighbouring node, and the weight of a vertex sharing neighbouring node may be calculated as follows.

According to point-to-point error measurement in related art, the closer the location of a point selected for geometry reconstruction after spatial scalability is to where points are distributed densely within the raw point cloud, the less the error after geometry reconstruction. In addition, as currently the decoding is not performed yet to the bottom layer, no accurate location of the raw cloud point can be acquired. Therefore, the distribution of points within the raw point cloud may be predicted using neighbouring node information. Taking FIG. 7 as an example, among the 26 neighbouring nodes of the current node, there are currently 3 neighbouring nodes (such as a surface sharing neighbouring node, an edge sharing neighbouring node, and a vertex sharing neighbouring node). Then, if a point selected within the current node shifts toward the three nodes, a theoretical error generated with the method for geometry reconstruction may be less than that with the solution adopting the coordinate information of the center of the current node, according to the point-to-point error measurement.

Specifically, the closer a neighbouring node is, the greater a shift impact the neighbouring node generates. Therefore, the weight of a surface sharing neighbouring node>the weight of an edge sharing neighbouring node>the weight of a vertex sharing neighbouring node. In this case, as shown in FIG. 7, the reciprocal of a Euler distance may be used as the preset ratio among the three weights. That is, the weight of the surface sharing neighbouring node: the weight of the edge sharing neighbouring node: the weight of the vertex sharing neighbouring $$\text{node} = 1: \frac{1}{\sqrt{2}}: \frac{1}{\sqrt{3}}.$$

Furthermore, as a point reconstructed within the current node cannot exceed the boundary of the current node, when a maximum shift impact is generated, a point reconstructed may be on the boundary of the current node. In this case, there may be 1 surface sharing neighbouring node, 4 edge sharing neighbouring nodes, and 4 vertex sharing neighbouring nodes. Thus, a normalized coefficient may be calculated as follows.

$$\left(\frac{1}{1 + \frac{4}{\sqrt{2}} + \frac{4}{\sqrt{3}}}\right) \times \frac{1}{2} = 0.081 \tag{14}$$

The weights of the three types of neighbouring nodes may be determined based on the normalized coefficient and the preset ratio among the weights, as follows.

The weight of a surface sharing neighbouring node may be $w_1 = 1 \times 0.081 = 0.081$.

The weight of an edge sharing neighbouring node may be $$w_2 = \frac{1}{\sqrt{2}} \times 0.081 = 0.057.$$

The weight of a vertex sharing neighbouring node may be $$w_3 = \frac{1}{\sqrt{3}} \times 0.081 = 0.046.$$

That is, in a specific example, in case the preset ratio is $$1: \frac{1}{\sqrt{2}}: \frac{1}{\sqrt{3}},$$

it may be determined that the weight of the surface sharing neighbouring node is 0.081, the weight of the edge sharing neighbouring node is 0.057, and that the weight of the vertex sharing neighbouring node is 0.046.

In another specific of example, in case the preset ratio is $$1: \frac{1}{\sqrt{2}}: \frac{1}{\sqrt{3}},$$

it may be determined that the weight of the surface sharing neighbouring node is 0.115, the weight of the edge sharing neighbouring node is 0.057, and that the weight of the vertex sharing neighbouring node is 0.038.

Note that the preset ratio among the weight of the surface sharing neighbouring node, the weight of the edge sharing neighbouring node, and the weight of the vertex sharing neighbouring node is not limited to the two cases, and may be set as another ratio, which is not limited by embodiments of the disclosure.

Further note that the weight obtained above (such as 0.081, 0.057, 0.046) may be a floating point number, which may be approximated by binary shift in an actual standard proposal.

Thus, the coordinates of the current node after geometry reconstruction may be determined after the factor of impact of a neighbouring node in direction along a preset axis on the current node and the weight of the neighbouring node have been obtained.

In S504, coordinates of the current node after geometry reconstruction are determined based on the weight of the neighbouring node and the factor of impact of the neighbouring node in direction along the preset axis on the current node.

Here, taking the search range of the 26 neighbouring nodes as an example, the weight of the neighbouring node may include the weight of a surface sharing neighbouring node, the weight of an edge sharing neighbouring node, and the weight of a vertex sharing neighbouring node. The factor of impact of a neighbouring node in direction along a preset axis on the current node may include a factor of impact of a surface sharing neighbouring node, a factor of impact of an edge sharing neighbouring node, and a factor of impact of a vertex sharing neighbouring node in direction along the preset axis on the current node. Thus, in some embodiments, the method may further include operations as follows.

A coordinate correction value of the current node in direction along the preset axis may be obtained by performing weighting on the factor of impact of the vertex sharing neighbouring node, the factor of impact of the edge sharing neighbouring node, and the factor of impact of the surface sharing neighbouring node in direction along the preset axis on the current node based on the weight of the vertex sharing neighbouring node, the weight of the edge sharing neighbouring node, and the weight of the surface sharing neighbouring node of the current node.

The coordinates of the current node after geometry reconstruction may be determined based on the coordinate information of the center of the current node and the coordinate correction value of the current node in direction along the preset axis.

In a specific example, the coordinates of the current node after geometry reconstruction may be determined based on the coordinate information of the center of the current node and the coordinate correction value of the current node in direction along the preset axis, as follows.

The coordinates of the current node after geometry reconstruction may be obtained as a sum of the coordinate information of the center of the current node and the coordinate correction value of the current node in direction along the preset axis.

More specifically, the coordinates of the current node after geometry reconstruction may include an X coordinate after geometry reconstruction, a Y coordinate after geometry reconstruction, and a Z coordinate after geometry reconstruction.

The coordinates of the current node after geometry reconstruction may be obtained as a sum of the coordinate information of the center of the current node and the coordinate correction value of the current node in direction along the preset axis, as follows.

The X coordinate of the current node after geometry reconstruction may be obtained as a sum of X coordinate information of the center of the current node and an X coordinate correction value of the current node.

The Y coordinate of the current node after geometry reconstruction may be obtained as a sum of Y coordinate information of the center of the current node and an Y coordinate correction value of the current node.

The Z coordinate of the current node after geometry reconstruction may be obtained as a sum of Z coordinate information of the center of the current node and an Z coordinate correction value of the current node.

Note that taking the search range of the 26 neighbouring nodes as an example, assuming that the coordinate information of the center is denoted by ($x_0$, $y_0$, $z_0$), the weight of the surface sharing neighbouring node is denoted by $w_1$, the weight of the edge sharing neighbouring node is denoted by $w_2$, and the weight of the vertex sharing neighbouring node is denoted by $w_3$. The factor of impact of the surface sharing neighbouring node in direction along the X-axis on the current node with center coordinate information ($x_0$, $y_0$, $z_0$) may be $|b_{1x}|$, the factor of impact of the surface sharing neighbouring node in direction along the Y-axis on the current node may be $|b_{1y}|$, and the factor of impact of the surface sharing neighbouring node in direction along the Z-axis on the current node may be $|b_{1z}|$. The factor of impact of the edge sharing neighbouring node in direction along the X-axis on the current node may be $\|b_{2x}\|$, the factor of impact of the edge sharing neighbouring node in direction along the Y-axis on the current node may be $\|b_{2y}\|$, and the factor of impact of the edge sharing neighbouring node in direction along the Z-axis on the current node may be $\|b_{2z}\|$. The factor of impact of the vertex sharing neighbouring node in direction along the X-axis on the current node may be $\|b_{3x}\|$, the factor of impact of the vertex sharing neighbouring node in direction along the Y-axis on the current node may be $\|b_{3y}\|$, and the factor of impact of the vertex sharing neighbouring node in direction along the Z-axis on the current node may be $\|b_{3z}\|$. Thus, the coordinates of the current node after geometry reconstruction may be calculated as follows.

$$\begin{cases} x = x_0 + w_1 \times |b_{1x}| + w_2 \times \|b_{2x}\| + w_3 \times \|b_{3x}\| \\ y = y_0 + w_1 \times |b_{1y}| + w_2 \times \|b_{2y}\| + w_3 \times \|b_{3y}\| \\ z = z_0 + w_1 \times |b_{1z}| + w_2 \times \|b_{2z}\| + w_3 \times \|b_{3z}\| \end{cases} \quad (15)$$

Illustratively, if $w_1$ is 0.081, $w_2$ is 0.057, and $w_3$ is 0.046, then formula (15) may be equivalent to the formula as follows.

$$\begin{cases} x = x_0 + 0.081|b_{1x}| + 0.057\|b_{2x}\| + 0.046\|b_{3x}\| \\ y = y_0 + 0.081|b_{1y}| + 0.057\|b_{2y}\| + 0.046\|b_{3y}\| \\ z = z_0 + 0.081|b_{1z}| + 0.057\|b_{2z}\| + 0.046\|b_{3z}\| \end{cases} \quad (16)$$

In short, embodiments of the disclosure provide a method for geometry reconstruction based on a point cloud neighbouring node, which exploits spatial correlation between the current node and any surrounding neighbouring node, and calculates geometric coordinates after spatial scalability coding of a point cloud using neighbour information of different weights. For example, weights 0.081, 0.057, and 0.046 are adopted respectively for a surface neighbour, an edge neighbour, and a vertex neighbour. Point coordinates upon geometry reconstruction may be calculated according to information on point existence within the range of the 26 neighbouring nodes surrounding the current node. Numerical values of the coordinates are closer to average coordinates of all points within the node, thereby reducing the error in geometry reconstruction after spatial scalability.

In another embodiment of the disclosure, considering algorithmic complexity and time consumption, as a possible alternative solution, the neighbouring node determined according to an embodiment of the disclosure may contain only the surface sharing neighbouring node.

Figure 8:
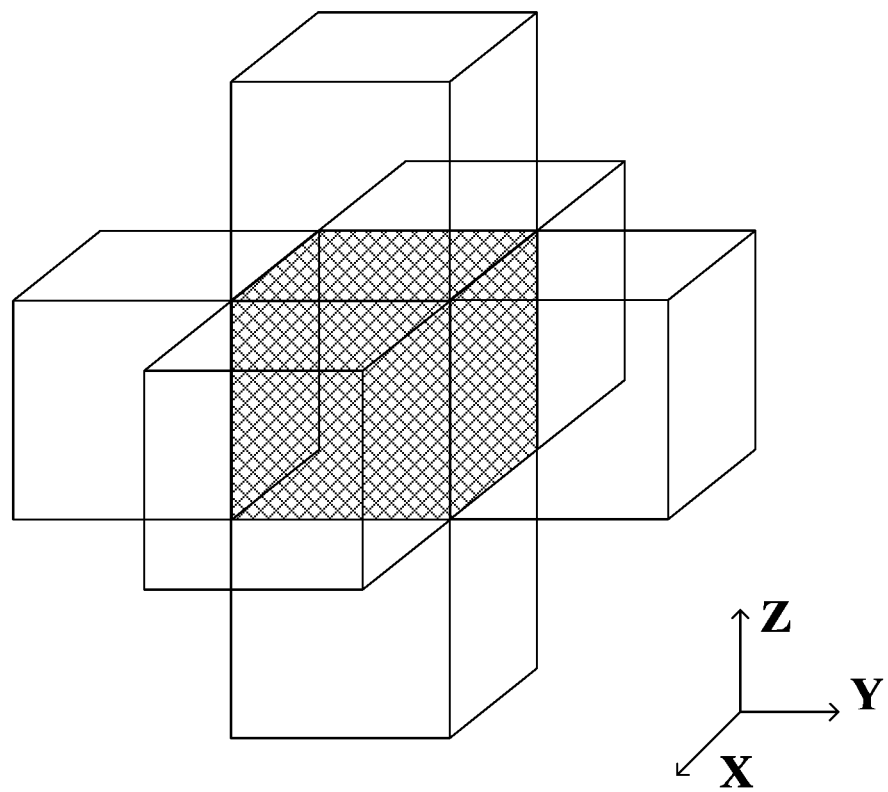
FIG. 8 is yet another diagram of relation among locations of a current node and neighbouring nodes according to embodiments of the disclosure.
Figure 9:
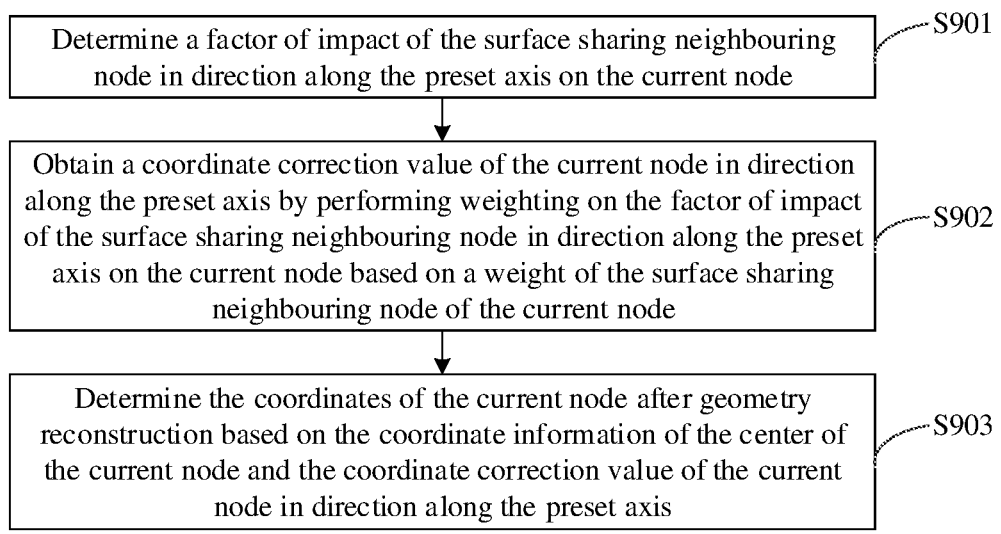
FIG. 9 is a flowchart of another method for geometry reconstruction according to embodiments of the disclosure.

Specifically, in embodiments of the disclosure, the search range of neighbouring nodes may be changed to be 6, i.e., just the 6 surface sharing neighbouring nodes, specifically as shown in FIG. 8. In FIG. 8, the cube filled with grey denotes the current node, which may be surrounded by the 6 surface sharing neighbouring nodes neighbouring respectively at the 6 surfaces. In this case, FIG. 9 shows a flowchart of another method for geometry reconstruction according to embodiments of the disclosure. As shown in FIG. 9, the method may include operations S901 to S903 as follows.

In S901, a factor of impact of the surface sharing neighbouring node in direction along the preset axis on the current node may be determined.

Note that when the attribute information of the neighbouring node indicates that the neighbouring node includes a surface sharing neighbouring node, a factor of impact of the surface sharing neighbouring node in direction along the preset axis on the current node may be determined based on the coordinate information of the center of the current node and the surface sharing neighbouring node.

In this case, assuming that the coordinate information of the center of the current node is denoted by ($x_0$, $y_0$, $z_0$), the factor of impact of the surface sharing neighbouring node neighbouring at a surface in direction along the X-axis on the current node is denoted by $b_{1x}$, the factor of impact of the surface sharing neighbouring node neighbouring at a surface in direction along the Y-axis on the current node is denoted by $b_{1y}$, and the factor of impact of the surface sharing neighbouring node neighbouring at a surface in direction along the Z-axis on the current node is denoted by $b_{1z}$. In this case, $b_{1x}$, $b_{1y}$, and $b_{1z}$ may be obtained through calculation according to formulas (5), (6), and (7).

Further, as results obtained using formulas (5), (6), and (7) are scalars, in some embodiments, the method may further include an operation as follows.

The absolute value of the factor of impact of the surface sharing neighbouring node may be calculated, and be determined as the factor of impact of the surface sharing neighbouring node.

That is, the factor of impact of the surface sharing neighbouring node in direction along the X-axis on the current node may be $|b_{1x}|$, the factor of impact of the surface sharing neighbouring node in direction along the Y-axis on the current node may be $|b_{1y}|$, and the factor of impact of the surface sharing neighbouring node in direction along the Z-axis on the current node may be $|b_{1z}|$.

In S902, a coordinate correction value of the current node in direction along the preset axis may be obtained by performing weighting on the factor of impact of the surface sharing neighbouring node in direction along the preset axis on the current node based on a weight of the surface sharing neighbouring node of the current node.

Note that in this case, the weight of the surface sharing neighbouring node may be a preset constant. In a specific example, the preset constant may be ¼. That is, the weight of the surface sharing neighbouring node may be 0.25, which is not limited by embodiments of the disclosure.

Thus, the X coordinate correction value of the current node in direction along the X-axis may be $0.25|b_{1x}|$, the Y coordinate correction value of the current node in direction along the Y-axis may be $0.25|b_{1y}|$, and the Z coordinate correction value of the current node in direction along the Z-axis may be $0.25|b_{1z}|$.

Further note that in an actual application, $0.25|b_{1x}|$ may be implemented by shifting the binary $|b_{1x}|$ to the right by two bits. Likewise, $0.25|b_{1y}|$ and $0.25|b_{1z}|$ may also be implemented by binary shift.

In S903, the coordinates of the current node after geometry reconstruction may be determined based on the coordinate information of the center of the current node and the coordinate correction value of the current node in direction along the preset axis.

In a specific example, in S903, the coordinates of the current node after geometry reconstruction may be determined based on the coordinate information of the center of the current node and the coordinate correction value of the current node in direction along the preset axis, as follows.

The coordinates of the current node after geometry reconstruction may be obtained as a sum of the coordinate information of the center of the current node and the coordinate correction value of the current node in direction along the preset axis.

More specifically, the coordinates of the current node after geometry reconstruction may include an X coordinate after geometry reconstruction, a Y coordinate after geometry reconstruction, and a Z coordinate after geometry reconstruction.

The coordinates of the current node after geometry reconstruction may be obtained as the sum of the coordinate information of the center of the current node and the coordinate correction value of the current node in direction along the preset axis, as follows.

The X coordinate of the current node after geometry reconstruction may be obtained as a sum of X coordinate information of the center of the current node and an X coordinate correction value of the current node.

The Y coordinate of the current node after geometry reconstruction may be obtained as a sum of Y coordinate information of the center of the current node and a Y coordinate correction value of the current node.

The Z coordinate of the current node after geometry reconstruction may be obtained as a sum of Z coordinate information of the center of the current node and a Z coordinate correction value of the current node.

Note that taking the search range of the 6 neighbouring nodes as an example, assuming that the coordinate information of the center is denoted by $(x_0, y_0, z_0)$, the weight of the surface sharing neighbouring node is denoted by $w_1$. The factor of impact of the surface sharing neighbouring node in direction along the X-axis on the current node with center coordinate information $(x_0, y_0, z_0)$ may be $|b_{1x}|$, the factor of impact of the surface sharing neighbouring node in direction along the Y-axis on the current node may be $|b_{1y}|$, and the factor of impact of the surface sharing neighbouring node in direction along the Z-axis on the current node may be $|b_{1z}|$. Thus, the coordinates of the current node after geometry reconstruction may be calculated as follows.

$$\begin{cases} x = x_0 + w_1 \times |b_{1x}| \\ y = y_0 + w_1 \times |b_{1y}| \\ z = z_0 + w_1 \times |b_{1z}| \end{cases} \quad (17)$$

Illustratively, if $w_1$ is 0.25, then formula (17) may be equivalent to the formula as follows.

$$\begin{cases} x = x_0 + 0.25|b_{1x}| \\ y = y_0 + 0.25|b_{1y}| \\ z = z_0 + 0.25|b_{1z}| \end{cases} \quad (18)$$

In yet another embodiment of the disclosure, considering algorithmic complexity and time consumption, as another possible alternative solution, the neighbouring node determined according to an embodiment of the disclosure may contain only the surface sharing neighbouring node and the edge sharing neighbouring node.

Figure 10:
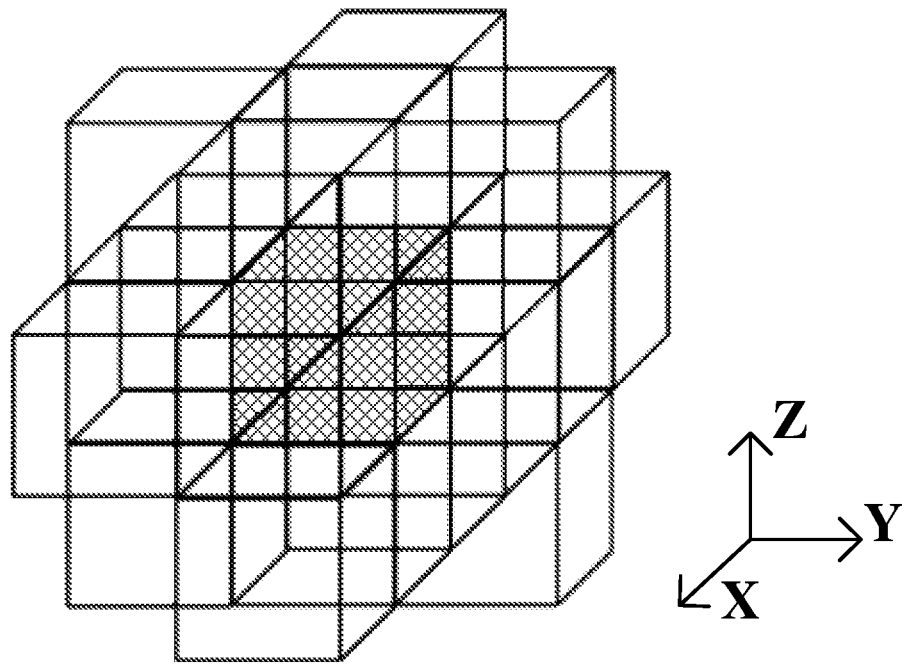
FIG. 10 is yet another diagram of relation among locations of a current node and neighbouring nodes according to embodiments of the disclosure.
Figure 11:
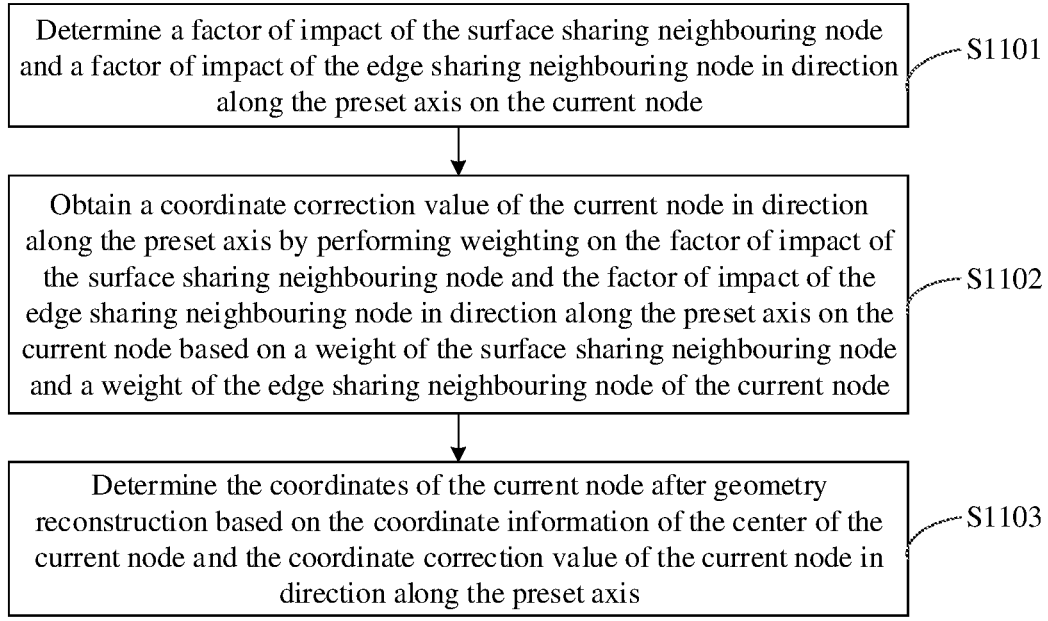
FIG. 11 is a flowchart of yet another method for geometry reconstruction according to embodiments of the disclosure.

Specifically, in embodiments of the disclosure, the search range of neighbouring nodes may be changed to be 18, i.e., just the 6 surface sharing neighbouring nodes and the 12 edge sharing neighbouring nodes, specifically as shown in FIG. 10. In FIG. 10, the cube filled with grey denotes the current node, which may be surrounded by the 6 surface sharing neighbouring nodes neighbouring respectively at the 6 surfaces, and the 12 edge sharing neighbouring nodes neighbouring respectively at the 12 edges. In this case, FIG. 11 shows a flowchart of yet another method for geometry reconstruction according to embodiments of the disclosure. As shown in FIG. 11, the method may include operations S1101 to S1103 as follows.

In S1101, a factor of impact of the surface sharing neighbouring node and a factor of impact of the edge sharing neighbouring node in direction along the preset axis on the current node may be determined.

Note that when the attribute information of the neighbouring node indicates that the neighbouring node includes a surface sharing neighbouring node, a factor of impact of the surface sharing neighbouring node in direction along the preset axis on the current node may be determined based on the coordinate information of the center of the current node and the surface sharing neighbouring node. When the attribute information of the neighbouring node indicates that the neighbouring node includes an edge sharing neighbouring node, a factor of impact of the edge sharing neighbouring node in direction along the preset axis on the current node may be determined based on the coordinate information of the center of the current node and the edge sharing neighbouring node.

In this case, assuming that the coordinate information of the center of the current node is denoted by $(x_0, y_0, z_0)$, the factor of impact of the surface sharing neighbouring node neighbouring at a surface in direction along the X-axis on the current node is denoted by $b_{1x}$, the factor of impact of the surface sharing neighbouring node neighbouring at a surface in direction along the Y-axis on the current node is denoted by $b_{1y}$, and the factor of impact of the surface sharing neighbouring node neighbouring at a surface in direction along the Z-axis on the current node is denoted by $b_{1z}$. In this case, $b_{1x}$, $b_{1y}$, and $b_{1z}$ may be obtained through calculation according to formulas (5), (6), and (7). The factor of impact of the edge sharing neighbouring node neighbouring at an edge in direction along the X-axis on the current node is denoted by $b_{2x}$, the factor of impact of the edge sharing neighbouring node neighbouring at an edge in direction along the Y-axis on the current node is denoted by $b_{2y}$, and the factor of impact of the edge sharing neighbouring node neighbouring at an edge in direction along the Z-axis on the current node is denoted by $b_{2z}$. In this case, $b_{2x}$, $b_{2y}$, and $b_{2z}$ may be obtained through calculation according to formulas (8), (9), and (10).

Further, as results obtained using formulas (5), (6), and (7) are scalars, in some embodiments, the method may further include an operation as follows.

The absolute value of the factor of impact of the surface sharing neighbouring node may be calculated, and be determined as the factor of impact of the surface sharing neighbouring node.

That is, the factor of impact of the surface sharing neighbouring node in direction along the X-axis on the current node may be $|b_{1x}|$, the factor of impact of the surface sharing neighbouring node in direction along the Y-axis on the current node may be $|b_{1y}|$, and the factor of impact of the surface sharing neighbouring node in direction along the Z-axis on the current node may be $|b_{1z}|$.

Further, as results obtained using formulas (8), (9), and (10) are vectors, in some embodiments, the method may further include an operation as follows.

The norm of the factor of impact of the edge sharing neighbouring node may be calculated, and be determined as the factor of impact of the edge sharing neighbouring node.

That is, the factor of impact of the edge sharing neighbouring node in direction along the X-axis on the current node may be $\|b_{2x}\|$, the factor of impact of the edge sharing neighbouring node in direction along the Y-axis on the current node may be $\|b_{2y}\|$, and the factor of impact of the edge sharing neighbouring node in direction along the Z-axis on the current node may be $\|b_{2z}\|$.

In S1102, a coordinate correction value of the current node in direction along the preset axis may be obtained by performing weighting on a factor of impact of the surface sharing neighbouring node and a factor of impact of the edge sharing neighbouring node in direction along the preset axis on the current node based on a weight of the surface sharing neighbouring node and a weight of the edge sharing neighbouring node of the current node.

Note that in this case, the weight of the surface sharing neighbouring node and the weight of the edge sharing neighbouring node may be determined as follows.

A preset ratio between the weight of the surface sharing neighbouring node and the weight of the edge sharing neighbouring node may be determined based on distances from the current node to the surface sharing neighbouring node and to the edge sharing neighbouring node.

A normalized coefficient may be obtained by normalizing the preset ratio.

The weight of the surface sharing neighbouring node and the weight of the edge sharing neighbouring node of the current node may be determined based on the normalized coefficient and the preset ratio.

The embodiment of the disclosure may also be an improvement based on point-to-point error measurement. The weight of a surface sharing neighbouring node and the weight of an edge sharing neighbouring node may be calculated as follows.

The closer a neighbouring node is, the greater a shift impact the neighbouring node generates. Therefore, the weight of a surface sharing neighbouring node>the weight of an edge sharing neighbouring node. In this case, the reciprocal of a Euler distance may be used as the preset ratio between the two weights. That is, the weight of a surface sharing neighbouring node: the weight of an edge sharing neighbouring $$\text{node} = 1 : \frac{1}{\sqrt{2}}.$$

Furthermore, as a point reconstructed within the current node cannot exceed the boundary of the current node, when a maximum shift impact is generated, a point reconstructed may be on the boundary of the current node. In this case, there may be 1 surface sharing neighbouring node and 4 edge sharing neighbouring nodes. Thus, a normalized coefficient may be calculated as follows.

$$\left(\frac{1}{1+\frac{4}{\sqrt{2}}}\right) \times \frac{1}{2} = 0.13 \tag{19}$$

The weights of the two types of neighbouring nodes may be determined based on the normalized coefficient and the preset ratio between the weights, as follows.

The weight of a surface sharing neighbouring node may be $w_1 = 1 \times 0.13 = 0.13$.

The weight of an edge sharing neighbouring node may be $$w_2 = \frac{1}{\sqrt{2}} \times 0.13 = 0.091.$$

That is, in a specific example, in case the preset ratio is $$1:\frac{1}{\sqrt{2}},$$

it may be determined that the weight of the surface sharing neighbouring node is 0.13, and that the weight of the edge sharing neighbouring node is 0.091.

In another specific of example, in case the preset ratio is $$1:\frac{1}{2},$$

it may be determined that the weight of the surface sharing neighbouring node is 0.166, and that the weight of the edge sharing neighbouring node is 0.083.

Note that the preset ratio between the weight of the surface sharing neighbouring node and the weight of the edge sharing neighbouring node is not limited to the two cases, and may be set as another ratio, which is not limited by embodiments of the disclosure.

Further note that a weight obtained above (such as 0.13, 0.091) may be a floating point number, which may be approximated by binary shift in an actual standard proposal.

Thus, the coordinate correction value of the current node in direction along the preset axis may be determined after the factor of impact of a neighbouring node in direction along a preset axis on the current node and the weight of the neighbouring node have been obtained. Specifically, if the weight of the surface sharing neighbouring node is 0.13, and the weight of the edge sharing neighbouring node is 0.091, then the X coordinate correction value of the current node in direction along the X-axis may be $0.13|b_{1x}|+0.091\|b_{2x}\|$, the Y coordinate correction value of the current node in direction along the Y-axis may be $0.13|b_{1y}|+0.091\|b_{2y}\|$, and the Z coordinate correction value of the current node in direction along the Z-axis may be $0.13|b_{1z}|+0.091\|b_{2z}\|$.

In S1103, the coordinates of the current node after geometry reconstruction may be determined based on the coordinate information of the center of the current node and the coordinate correction value of the current node in direction along the preset axis.

In a specific example, in S1103, the coordinates of the current node after geometry reconstruction may be determined based on the coordinate information of the center of the current node and the coordinate correction value of the current node in direction along the preset axis, as follows.

The coordinates of the current node after geometry reconstruction may be obtained as a sum of the coordinate information of the center of the current node and the coordinate correction value of the current node in direction along the preset axis.

More specifically, the coordinates of the current node after geometry reconstruction may include an X coordinate after geometry reconstruction, a Y coordinate after geometry reconstruction, and a Z coordinate after geometry reconstruction.

The coordinates of the current node after geometry reconstruction may be obtained as the sum of the coordinate information of the center of the current node and the coordinate correction value of the current node in direction along the preset axis, as follows.

The X coordinate of the current node after geometry reconstruction may be obtained as a sum of X coordinate information of the center of the current node and an X coordinate correction value of the current node.

The Y coordinate of the current node after geometry reconstruction may be obtained as a sum of Y coordinate information of the center of the current node and a Y coordinate correction value of the current node.

The Z coordinate of the current node after geometry reconstruction may be obtained as a sum of Z coordinate information of the center of the current node and a Z coordinate correction value of the current node.

Note that taking the search range of the 18 neighbouring nodes as an example, assuming that the coordinate information of the center is denoted by $(x_0, y_0, z_0)$, the weight of the surface sharing neighbouring node is denoted by $w_1$, and the weight of the edge sharing neighbouring node is denoted by $w_2$. The factor of impact of the surface sharing neighbouring node in direction along the X-axis on the current node with center coordinate information $(x_0, y_0, z_0)$ may be $|b_{1x}|$, the factor of impact of the surface sharing neighbouring node in direction along the Y-axis on the current node may be $|b_{1y}|$, and the factor of impact of the surface sharing neighbouring node in direction along the Z-axis on the current node may be $|b_{1z}|$. The factor of impact of the edge sharing neighbouring node in direction along the X-axis on the current node may be $\|b_{2x}\|$, the factor of impact of the edge sharing neighbouring node in direction along the Y-axis on the current node may be $\|b_{2y}\|$, and the factor of impact of the edge sharing neighbouring node in direction along the Z-axis on the current node may be $\|b_{2z}\|$. Thus, the coordinates of the current node after geometry reconstruction may be calculated as follows.

$$\begin{cases} x = x_0 + w_1 \times |b_{1x}| + w_2 \times \|b_{2x}\| \\ y = y_0 + w_1 \times |b_{1y}| + w_2 \times \|b_{2y}\| \\ z = z_0 + w_1 \times |b_{1z}| + w_2 \times \|b_{2z}\| \end{cases} \quad (20)$$

Illustratively, if $w_1$ is 0.13, and $w_2$ is 0.091, then formula (20) may be equivalent to the formula as follows.

$$\begin{cases} x = x_0 + 0.13|b_{1x}| + 0.091\|b_{2x}\| \\ y = y_0 + 0.13|b_{1y}| + 0.091\|b_{2y}\| \\ z = z_0 + 0.13|b_{1z}| + 0.091\|b_{2z}\| \end{cases} \quad (21)$$

In short, embodiments of the disclosure provide a method for geometry reconstruction based on a point cloud neighbouring node, which exploits spatial correlation between the current node and any surrounding neighbouring node, and calculates point coordinates upon geometry reconstruction according to different cases of neighbouring nodes. Numerical values of the coordinates are closer to average coordinates of all points within the node, thereby reducing the error in geometry reconstruction after spatial scalability.

Specifically, embodiments of the disclosure propose a method for geometry reconstruction with spatial scalability coding of a point cloud based on weight(s) of neighbouring node(s). Coordinates of the location of a current node under consideration are calculated based on information on point existence within the 26 neighbouring nodes surrounding each node. The specific process is as follows, taking the search range of the 26 neighbouring nodes as an example below.

First, when a decoder performs spatial scalability decoding, a size of a node corresponding to a skip layer may be L ($L=2^{skip\ layer}$). Search may be performed for information on point existence within the 26 neighbouring nodes surrounding each skip layer node. A function $g(x_i, y_i, z_i)$ may denote the information on point existence within the following range:

$$x \in \left(x_i - \frac{L}{2}, x_i + \frac{L}{2}\right), y \in \left(y_i - \frac{L}{2}, y_i + \frac{L}{2}\right), z \in \left(z_i - \frac{L}{2}, z_i + \frac{L}{2}\right)$$

$g(x_i, y_i, z_i)=1$ when point existence within the node is true. $g(x_i, y_i, z_i)=0$ when point existence within the range is false. The relation between locations of the node and the 26 neighbouring nodes surrounding the node may be as shown in FIG. 6.

Secondly, according to the extent of contact with the node, a neighbouring relation may be divided into neighbouring at a surface, neighbouring at an edge, and neighbouring at a vertex. As shown in FIG. 7, the cube filled with grey denotes the current node. A cube node W1 shares a common surface with the current node in direction along the Z-axis. So, the two nodes neighbour at a surface, in direction along the Z-axis. The cube node W1 may be referred to as a surface sharing neighbouring node. A cube node W2 shares a common edge with the current node in direction along X-Y. The cube node neighbours the current node at an edge, in direction along X-Y. So, the cube node W2 may be referred to as an edge sharing neighbouring node. A cube node W3 shares a common vertex with the current node in direction along X-Y-Z. The cube node neighbours the current node at a vertex, in direction along X-Y-Z. So, the cube node W3 may be referred to as a vertex sharing neighbouring node. Here, neighbouring at a surface does not count as neighbouring at an edge and does not count as neighbouring at a vertex, and neighbouring at an edge does not count as neighbouring at a vertex. With embodiments of the disclosure, different weights may be adopted respectively for a neighbouring node neighbouring at a surface, a neighbouring node neighbouring at an edge, and a neighbouring node neighbouring at a vertex (i.e., a surface sharing neighbouring node, an edge sharing neighbouring node, and a vertex sharing neighbouring node). Illustratively, the weight of neighbouring at a surface (i.e., the weight of the surface sharing neighbouring node) may be $w_1$ ($w_1=0.081$), the weight of neighboring at an edge (i.e., the weight of the edge sharing neighbouring node) may be $w_2$ ($w_2=0.057$), and the weight of neighboring at a vertex (i.e., the weight of the vertex sharing neighbouring node) may be $w_3$ ($w_3=0.046$). The specific relation between the locations may be as shown in FIG. 7.

Third, the coordinate information of the center of the current node may be denoted by ($x_0$, $y_0$, $z_0$), i.e., the center of the cube filled with grey in FIG. 7. Impact of neighboring at a surface, impact of neighboring at an edge, and impact of neighboring at a vertex in direction along k-axis on the current node may be denoted by $b_{1k}$, $b_{2k}$, $b_{3k}$, respectively, with k=x, y, z.

On the current node centered on ($x_0$, $y_0$, $z_0$), impact of neighboring at a surface in direction along the X-axis may be $b_{1x}$, impact of neighboring at a surface in direction along the Y-axis may be $b_{1y}$, and impact of neighboring at a surface in direction along the Z-axis may be biz, specifically as shown by the formulas (5), (6), and (7).

On the current node centered on ($x_0$, $y_0$, $z_0$), impact of neighboring at an edge in direction along the X-axis may be $b_{2x}$, impact of neighboring at an edge in direction along the Y-axis may be $b_{2y}$, and impact of neighboring at an edge in direction along the Z-axis may be $b_{2z}$, specifically as shown by the formulas (8), (9), and (10).

On the current node centered on ($x_0$, $y_0$, $z_0$), impact of neighboring at a vertex in direction along the X-axis may be $b_{3x}$, impact of neighboring at a vertex in direction along the Y-axis may be $b_{3y}$, and impact of neighboring at a vertex in direction along the Z-axis may be $b_{3z}$, specifically as shown by the formulas (11), (12), and (13).

Thus, in case the weight of the surface sharing neighbouring node is 0.081, the weight of the edge sharing neighbouring node is 0.057, and the weight of the vertex sharing neighbouring node is 0.046, the coordinates upon geometry reconstruction obtained using the method for geometry reconstruction may be denoted by the formula (16).

Embodiments of the disclosure cover calculation of geometric coordinates after spatial scalability coding of a point cloud using neighbour information of different weights. For example, weights 0.081, 0.057, and 0.046 are adopted respectively for a surface neighbour, an edge neighbour, and a vertex neighbour. Reconstructed geometric coordinates of the current node may be calculated according to information on point existence within the range of the 26 neighbouring nodes surrounding the current node. Thus, technical solutions of the disclosure make the most of spatial correlation of a point cloud, reducing an error in geometry reconstruction after spatial scalability. A peak signal to noise ratio (PSNR) of geometric information here may denote the numerical reduction (in case of a positive PSNR) or increase (in case of a negative PSNR) in a geometric error brought by technical solutions of the disclosure as compared to related art, given the same bit rate. Table 1 shows cases with the skip layer=1, 2, 3, 4.

D1-PSNR may be calculated according to a formula as follows.

$$D1 - PSNR = 10\log_{10}\left(\frac{3p^2}{max\left(e_{B,A}^{D1}, e_{A,B}^{D1}\right)}\right) \quad (22)$$

D2-PSNR may be calculated according to a formula as follows.

$$D2 - PSNR = 10\log_{10}\left(\frac{3p^2}{max\left(e_{B,A}^{D2}, e_{A,B}^{D2}\right)}\right) \quad (23)$$

The p may be the constant peak value of each reference point cloud defined in Table 1, be determined by a point cloud sequence, and specifically be as shown by the bold part in Table 2.

TABLE 1

| | PSNR of geometric information | | | | | | | |
|---|---|---|---|---|---|---|---|---|
| | skip layer = 1 | | skip layer = 2 | | skip layer = 3 | | skip layer = 4 | |
| point cloud sequence | D1-PSNR | D2-PSNR | D1-PSNR | D2-PSNR | D1-PSNR | D2-PSNR | D1-PSNR | D2-PSNR |
| basketball_player_vox11_00000200 | 1.28 | 0.7 | 1.96 | 5.33 | 1.93 | 7.73 | 1.7 | 7.86 |
| dancer_vox11_00000001 | 1.32 | 0.83 | 1.94 | 5.31 | 1.84 | 7.48 | 1.58 | 7.48 |
| egyptian_mask_vox12 | 0 | 0 | −0.02 | 0 | −1.25 | 1.08 | 0.55 | 3.86 |
| facade_00009_vox12 | −0.81 | −0.05 | 0.51 | 1.72 | 0.91 | 3.28 | 1.17 | 4.53 |
| frog_00067_vox12 | −0.12 | 0.1 | 0.84 | 2.04 | 1.39 | 4.52 | 1.91 | 6.89 |
| house_without_roof_00057_vox12 | −0.06 | 0.16 | 0.87 | 2.24 | 1.11 | 4.22 | 1.43 | 6.41 |
| longdress_vox10_1300 | 1.29 | 0.68 | 1.76 | 4.32 | 1.27 | 3.98 | 0.89 | 3.94 |
| loot_vox10_1200 | 1.26 | 0.72 | 1.78 | 4.47 | 1.5 | 4.41 | 1.12 | 4.31 |
| queen_0200 | 1.2 | 0.7 | 1.65 | 4.32 | 1.36 | 4.31 | 0.89 | 3.64 |
| redandblack_vox10_1550 | 1.29 | 0.81 | 1.78 | 4.47 | 1.37 | 4.37 | 0.8 | 3.56 |
| shiva_00035_vox12 | −0.23 | 0.05 | −0.3 | 0.35 | 0.1 | 0.49 | 0.86 | 2.46 |
| soldier_vox10_0690 | 1.36 | 0.84 | 1.83 | 4.73 | 1.48 | 3.65 | 1.18 | 4.47 |
| ulb_unicorn_vox13 | −0.04 | 0.02 | −0.1 | 0.13 | −0.31 | 0.65 | 0.18 | 1.21 |
| average | 0.6 | 0.43 | 1.12 | 3.03 | 0.98 | 3.86 | 1.1 | 4.66 |

TABLE 2

Constant peak value of point cloud sequence

| Content Category | Test Class | Test material dataset filename | Frames | fps | # Pts | Geometry Precision | Peak Value (p) | Attributes |
|---|---|---|---|---|---|---|---|---|
| (1) Static Objects and Scenes | A | basketball_player_vox11_00000200 [j] | 1 | | 2,925,514 | 11 bit | 2047 | R, G, B |
| | | boxer_viewdep_vox12 [b] | 1 | | 3,493,085 | 12 bit | 4095 | R, G, B |
| | | dancer_vox11_00000001 [j] | 1 | | 2,592,758 | 11 bit | 2047 | R, G, B |
| | | Egyptian_mask_vox12 [a] | 1 | | 272,684 | 12 bit | 4095 | R, G, B |
| | | Facade_00009_vox12 [a] | 1 | | 1,596,085 | 12 bit | 4095 | R, G, B |
| | | Facade_00015_vox14 [a] | 1 | | 8,907,880 | 14 bit | 16383 | R, G, B |
| | | Facade_00064_vox11 [TBD] | 1 | | 4,061,755 | 11 bit | 2047 | R, G, B |
| | | . . . | . . . | | . . . | . . . | . . . | . . . |

The embodiments provide a method for geometry reconstruction, applying to a decoder. A neighbouring node of a current node is determined based on location information of the current node. A factor of impact of the neighbouring node in direction along a preset axis on the current node is determined based on attribute information of the neighbouring node. A weight of the neighbouring node of the current node is determined. Coordinates of the current node after geometry reconstruction are determined based on the weight of the neighbouring node and the factor of impact of the neighbouring node in direction along the preset axis on the current node. Thus, by making the most of spatial correlation of a point cloud while allocating a weight to a neighbouring node according to extent of contact between the neighbouring node and the current node under consideration, numerical values of calculated coordinates after geometry reconstruction are made closer to average coordinates of all points within the current node, thereby reducing a geometric error in geometry reconstruction after spatial scalability.

Figure 12:
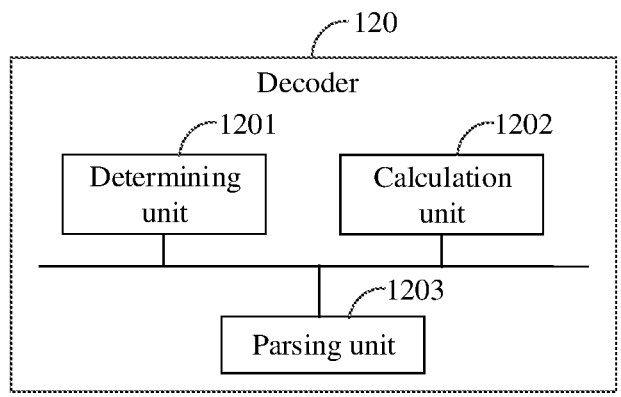
FIG. 12 is a diagram of a structure of composition of a decoder according to embodiments of the disclosure.

In another embodiment of the disclosure, based on the same concept of disclosure as the foregoing embodiments, referring to FIG. 12, which shows a diagram of a structure of composition of a decoder 120 according to embodiments of the disclosure. As shown in FIG. 12, the decoder 120 may include a determining unit 1201 and a calculation unit 1202.

The determining unit 1201 may be configured to determine a neighbouring node of a current node based on location information of the current node, and determine a factor of impact of the neighbouring node in direction along a preset axis on the current node based on attribute information of the neighbouring node.

The determining unit 1201 may be further configured to determine a weight of the neighbouring node of the current node.

The calculation unit 1202 may be configured to determine coordinates of the current node after geometry reconstruction based on the weight of the neighbouring node and the factor of impact of the neighbouring node in direction along the preset axis on the current node.

In some embodiments, the attribute information of the neighbouring node may include a type of the neighbouring node. The type of the neighbouring node may include at least one of a surface sharing neighbouring node neighbouring the current node at a surface, an edge sharing neighbouring node neighbouring the current node at an edge, or a vertex sharing neighbouring node neighbouring the current node at a vertex.

In some embodiments, the current node has 6 surface sharing neighbouring nodes, 12 edge sharing neighbouring nodes and 8 vertex sharing neighbouring nodes.

In some embodiments, determining the neighbouring node of the current node may include at least one of determining a surface sharing neighbouring node neighbouring the current node at a surface, determining an edge sharing neighbouring node neighbouring the current node at an edge, or determining a vertex sharing neighbouring node neighbouring the current node at a vertex.

In some embodiments, the determining unit 1201 may be further configured to determine coordinate information of a center of the current node; and determine the factor of impact of the neighbouring node in direction along the preset axis on the current node based on the coordinate information of the center and the attribute information of the neighbouring node.

In some embodiments, the determining unit 1201 may be further configured to, in response to the attribute information of the neighbouring node indicating that the neighbouring node includes the surface sharing neighbouring node, determine a factor of impact of the surface sharing neighbouring node in direction along the preset axis on the current node based on the coordinate information of the center of the current node and the surface sharing neighbouring node; in response to the attribute information of the neighbouring node indicating that the neighbouring node includes the edge sharing neighbouring node, determine a factor of impact of the edge sharing neighbouring node in direction along the preset axis on the current node based on the coordinate information of the center of the current node and the edge sharing neighbouring node; and in response to the attribute information of the neighbouring node indicating that the neighbouring node includes the vertex sharing neighbouring node, determine a factor of impact of the vertex sharing neighbouring node in direction along the preset axis on the current node based on the coordinate information of the center of the current node and the vertex sharing neighbouring node.

In some embodiments, the determining unit 1201 may be further configured to determine whether the neighbouring node contains a point.

In some embodiments, the calculation unit 1202 may be further configured to, in response to the neighbouring node including the surface sharing neighbouring node, the edge sharing neighbouring node, and the vertex sharing neighbouring node, obtain a coordinate correction value of the current node in direction along the preset axis by performing weighting on a factor of impact of the vertex sharing neighbouring node, a factor of impact of the edge sharing neighbouring node, and a factor of impact of the surface sharing neighbouring node in direction along the preset axis on the current node based on a weight of the vertex sharing neighbouring node, a weight of the edge sharing neighbouring node, and a weight of the surface sharing neighbouring node of the current node; and determine the coordinates of the current node after geometry reconstruction based on the coordinate information of the center of the current node and the coordinate correction value of the current node in direction along the preset axis.

In some embodiments, the calculation unit 1202 may be further configured to obtain the coordinates of the current node after geometry reconstruction as a sum of the coordinate information of the center of the current node and the coordinate correction value of the current node in direction along the preset axis.

In some embodiments, the determining unit 1201 may be further configured to determine a preset ratio among the weight of the surface sharing neighbouring node, the weight of the edge sharing neighbouring node, and the weight of the vertex sharing neighbouring node based on distances from the current node to the surface sharing neighbouring node, the edge sharing neighbouring node, and the vertex sharing neighbouring node.

The calculation unit 1202 may be further configured to obtain a normalized coefficient by normalizing the preset ratio, and determine the weight of the vertex sharing neighbouring node, the weight of the edge sharing neighbouring node, and the weight of the surface sharing neighbouring node of the current node based on the normalized coefficient and the preset ratio.

In some embodiments, the calculation unit 1202 may be further configured to, in response to the preset ratio being $$1:\frac{1}{\sqrt{2}}:\frac{1}{\sqrt{3}},$$

determine the weight of the surface sharing neighbouring node to be 0.081, the weight of the edge sharing neighbouring node to be 0.057, and the weight of the vertex sharing neighbouring node to be 0.046; or in response to the preset ratio being $$1:\frac{1}{2}:\frac{1}{3},$$

determine the weight of the surface sharing neighbouring node to be 0.115, the weight of the edge sharing neighbouring node to be 0.057, and the weight of the vertex sharing neighbouring node to be 0.038.

In some embodiments, the calculation unit 1202 may be further configured to, in response to the neighbouring node including only the surface sharing neighbouring node, obtain a coordinate correction value of the current node in direction along the preset axis by performing weighting on the factor of impact of the surface sharing neighbouring node in direction along the preset axis on the current node based on a weight of the surface sharing neighbouring node of the current node; and determine the coordinates of the current node after geometry reconstruction based on the coordinate information of the center of the current node and the coordinate correction value of the current node in direction along the preset axis.

In some embodiments, the calculation unit 1202 may be further configured to obtain the coordinates of the current node after geometry reconstruction as a sum of the coordinate information of the center of the current node and the coordinate correction value of the current node in direction along the preset axis.

In some embodiments, the weight of the surface sharing neighbouring node is a preset constant.

In some embodiments, the preset constant is ¼.

In some embodiments, the calculation unit 1202 may be further configured to, in response to the neighbouring node including the surface sharing neighbouring node and the edge sharing neighbouring node, obtain a coordinate correction value of the current node in direction along the preset axis by performing weighting on a factor of impact of the edge sharing neighbouring node and a factor of impact of the surface sharing neighbouring node in direction along the preset axis on the current node based on a weight of the edge sharing neighbouring node and a weight of the surface sharing neighbouring node of the current node; and determine the coordinates of the current node after geometry reconstruction based on the coordinate information of the center of the current node and the coordinate correction value of the current node in direction along the preset axis.

In some embodiments, the calculation unit 1202 may be further configured to obtain the coordinates of the current node after geometry reconstruction as a sum of the coordinate information of the center of the current node and the coordinate correction value of the current node in direction along the preset axis.

In some embodiments, the determining unit 1201 may be further configured to determine a preset ratio between the weight of the surface sharing neighbouring node and the weight of the edge sharing neighbouring node based on distances from the current node to the surface sharing neighbouring node and the edge sharing neighbouring node.

The calculation unit 1202 may be further configured to obtain a normalized coefficient by normalizing the preset ratio; and determine the weight of the edge sharing neighbouring node and the weight of the surface sharing neighbouring node of the current node based on the normalized coefficient and the preset ratio.

In some embodiments, the calculation unit 1202 may be further configured to, in response to the preset ratio being $$1:\frac{1}{\sqrt{2}},$$

determine the weight of the surface sharing neighbouring node to be 0.13, and the weight of the edge sharing neighbouring node to be 0.091; or in response to the preset ratio being $$1:\frac{1}{2},$$

determine the weight of the surface sharing neighbouring node to be 0.166, and the weight of the edge sharing neighbouring node to be 0.083.

In some embodiments, the coordinates of the current node after geometry reconstruction may include an X coordinate after geometry reconstruction, a Y coordinate after geometry reconstruction, and a Z coordinate after geometry reconstruction.

The calculation unit 1202 may be further configured to obtain the X coordinate of the current node after geometry reconstruction as a sum of X coordinate information of the center of the current node and an X coordinate correction value of the current node; obtain the Y coordinate of the current node after geometry reconstruction as a sum of Y coordinate information of the center of the current node and a Y coordinate correction value of the current node; and obtain the Z coordinate of the current node after geometry reconstruction as a sum of Z coordinate information of the center of the current node and a Z coordinate correction value of the current node.

In some embodiments, referring to FIG. 12, the decoder 120 may further include a parsing unit 1203 configured to obtain spatial scalability enabled flag information by parsing a bitstream.

The determining unit 1201 may be further configured to, in response to that the spatial scalability enabled flag information indicates not to decode a skip layer containing the current node, determine the neighbouring node of the current node based on the location information of the current node.

In some embodiments, the determining unit 1201 may be further configured to, in response to that the spatial scalability enabled flag information has a first value, determine that the spatial scalability enabled flag information indicates to decode the skip layer containing the current node; and in response to that the spatial scalability enabled flag information has a second value, determine that the spatial scalability enabled flag information indicates not to decode the skip layer containing the current node.

In some embodiments, the first value is 0, and the second value is 1; or the first value is false, and the second value is true.

Understandably, in embodiments of the disclosure, a "module" may be a part of a circuit, a part of a processor, a part of a program or software, or the like. Of course, a module may be a unit, or may be non-modularized. In addition, components in the embodiments may be integrated in one processing part, or exist as separate physical units respectively. Alternatively, two or more units may be integrated in one unit. The integrated unit may be implemented in form of hardware or software functional unit(s).

When implemented in form of a software functional module and sold or used as an independent product, an integrated unit herein may be stored in a computer-readable storage medium. Based on such an understanding, the essential part of the technical solutions of the embodiments or a part contributing to prior art or all or part of the technical solution may appear in form of a software product, which software product is stored in storage media, and includes a number of instructions for allowing computer equipment (such as a personal computer, a server, network equipment, and/or the like) or a processor to execute all or part of the operations of the methods of the embodiments. The storage media include various media that can store program codes, such as a U disk, a mobile hard disk, Read Only Memory (ROM), Random Access Memory (RAM), a magnetic disk, a CD, and/or the like.

Therefore, embodiments of the disclosure provide a computer-readable storage medium, applying to a decoder 120. The computer-readable storage medium has stored thereon a computer program which, when executed by at least one processor, implements the method according to any foregoing embodiment.

Figure 13:
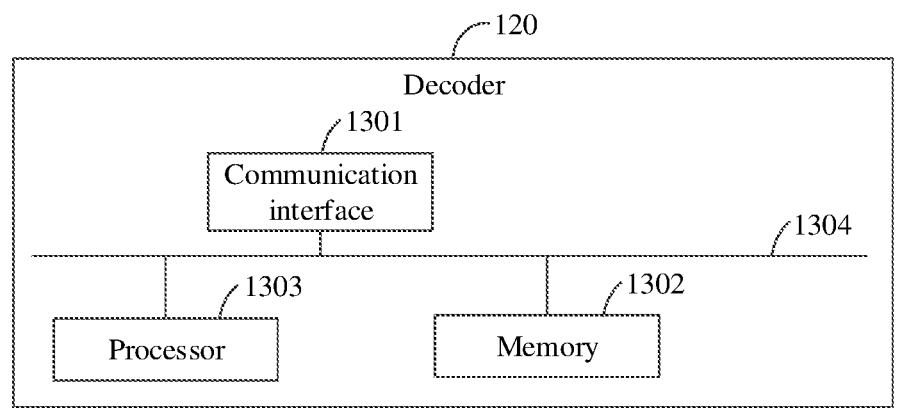
FIG. 13 is a diagram of a structure of specific hardware of a decoder according to embodiments of the disclosure.

FIG. 13 shows a diagram of a structure of specific hardware of a decoder 120 according to embodiments of the disclosure, based on the composition of the decoder 120 and the computer-readable storage medium. As shown in FIG. 13, the decoder may include a communication interface 1301, a memory 1302, and a processor 1303. Various components may be coupled together through a bus system 1304. Understandably, the bus system 1304 is used for implementing connection and communication among these components. In addition to a data bus, the bus system 1304 may further include a power bus, a control bus, and a status signal bus. However, for clarity of description, various buses are marked as the bus system 1304 in FIG. 13.

The communication interface 1301 may be configured to perform signal sending and receiving while performing information sending and receiving with another external network element.

The memory 1302 may be configured to store a computer program executable on the processor 1303.

The processor 1303 may be configured to, when executing the computer program, implement: determining a neighbouring node of a current node based on location information of the current node; determining a factor of impact of the neighbouring node in direction along a preset axis on the current node based on attribute information of the neighbouring node; determining a weight of the neighbouring node of the current node; and determining coordinates of the current node after geometry reconstruction based on the weight of the neighbouring node and the factor of impact of the neighbouring node in direction along the preset axis on the current node.

Understandably, the memory 1302 in embodiments of the disclosure may be volatile and/or non-volatile memory. The non-volatile memory may be Read-Only Memory (ROM), Programmable Read-Only Memory (PROM), Erasable Programmable Read-Only Memory (EPROM), Electrically Erasable Programmable Read-Only Memory (EEPROM), or flash memory. The volatile memory may be Random Access Memory (RAM) serving as an external cache. By way of illustrative instead of restrictive description, there may be many forms of RAM available, such as Static Random Access Memory (SRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM), and the like. The memory 1302 of the system and the method of the disclosure is intended to include, but is not limited to, these and any other memory of suitable types.

The processor 1303 may be an integrated circuit chip capable of signal processing. In implementation, each operation of the method may be carried out via an integrated logic circuit of hardware in the processor 1303 or instructions in form of software. The processor 1303 may be a general-purpose processor, a Digital Signal Processor (DSP), an Application Specific Integrated Circuit (ASIC), a Field Programmable Gate Array (FPGA), or another programmable logic device, a discrete gate, or a transistor logic device, a discrete hardware component, or the like. The processor may implement or execute various methods, operations, and logical block diagrams according to embodiments of the disclosure. A general-purpose processor may be a microprocessor or any conventional processor, or the like. The operations of the method disclosed embodiments of the disclosure may be directly embodied as being carried out by a hardware decoding processor, or by a combination of hardware and software modules in the decoding processor. A software module may be located in a mature storage medium in the art, such as a RAM, a flash memory, a ROM, a PROM, an electrically erasable programmable memory, a register, etc. The storage medium may be located in the memory 1302. The processor 1303 may read information in the memory 1302, and combine it with hardware of the processor to perform operations of a method herein.

Understandably, the embodiments according to the disclosure may be implemented by hardware, software, firmware, middleware, a microcode, or a combination of the any listed item. For hardware implementation, the processing unit may be implemented in one or more Application Specific Integrated Circuits (ASIC), DSP, Digital Signal Processing Devices (DSP Device, DSPD), Programmable Logic Devices (PLD), Field-Programmable Gate Arrays (FPGA), general-purpose processors, controllers, Micro Controller Units (MCU), microprocessors, and other electronic units for implementing the function of the disclosure, or a combination thereof. For software implementation, technology according to the disclosure may be implemented by a module, such as a process, a function, that implements the function of the disclosure. A software code may be stored in the memory and executed by the processor. The memory may be implemented internal or external to the processor.

In an embodiment, the processor 1303 is configured to execute the computer program to perform the method according to any foregoing embodiment.

Embodiments of the disclosure provide a decoder. The decoder may include a determining unit and a calculation unit. Thus, by making the most of spatial correlation of a point cloud while allocating a weight to a neighbouring node according to extent of contact between the neighbouring node and the current node under consideration, numerical values of calculated coordinates after geometry reconstruction are made closer to average coordinates of all points within the current node, thereby reducing a geometric error in geometry reconstruction after spatial scalability.

Figure 14:
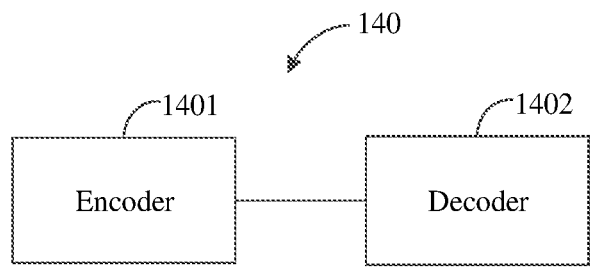
FIG. 14 is a diagram of a structure of composition of a point cloud system according to embodiments of the disclosure.

FIG. 14 shows a diagram of a structure of composition of a point cloud system according to embodiments of the disclosure. As shown in FIG. 14, the point cloud system 140 may include an encoder 1401 and a decoder 1402. The decoder 1402 may be a decoder according to any foregoing embodiment.

In embodiments of the disclosure, in one aspect, the encoder 1401 performs octree division on a raw point cloud to be coded, and signals the result of the division based on an octree coding mode. In another aspect, the encoder may further signal the value of spatial scalability enabled flag information (denoted by scalable_lifting_enabled_flag), for transfer to the decoder 1402. Then, the decoder 140 may obtain the value of scalable_lifting_enabled_flag by parsing a bitstream. In case the scalable_lifting_enabled_flag has a value of 1, the decoder 1402 is to perform a spatial scalability function, i.e., performing octree decoding in part. Thus, using a method for geometry reconstruction according to embodiments of the disclosure, by making the most of spatial correlation of a point cloud, numerical values of calculated coordinates after geometry reconstruction are made closer to average coordinates of all points within the current node, thereby reducing a geometric error in geometry reconstruction after spatial scalability.

Note that in the disclosure, a term such as "including/ comprising", "containing", or any other variant of the term is intended to cover a non-exclusive inclusion, such that a process, method, article, or device including a series of elements not only includes the elements, but also includes other element(s) not explicitly listed, or element(s) inherent to such a process, method, article, or device. Given no more limitation, an element defined by a phrase "including a . . . " does not exclude existence of another identical element in a process, method, article, or device that includes the element.

Numbering of embodiments of the disclosure is merely for illustration and does not indicate preference of one embodiment over another.

Methods disclosed in method embodiments of the disclosure may be combined with each other as needed to acquire a new method embodiment, as long as no conflict results from the combination.

Features disclosed in product embodiments of the disclosure may be combined with each other as needed to acquire a new product embodiment, as long as no conflict results from the combination.

Features disclosed in method or device embodiments of the disclosure may be combined with each other as needed to acquire a new method or device embodiment, as long as no conflict results from the combination.

What described are but embodiments of the disclosure and are not intended to limit the scope of the disclosure. Any modification, equivalent replacement, and/or the like made within the technical scope of the disclosure, as may occur to a person having ordinary skill in the art, shall be included in the scope of the disclosure. The scope of the disclosure thus should be determined by the claims.

The invention claimed is:

1. A method for geometry reconstruction, applying to a decoder, the method comprising:
   determining a neighbouring node of a current node based on location information of the current node;
   determining a factor of impact of the neighbouring node in direction along a preset axis on the current node based on attribute information of the neighbouring node;
   determining a weight of the neighbouring node of the current node; and
   determining coordinates of the current node after geometry reconstruction based on the weight of the neighbouring node and the factor of impact of the neighbouring node in direction along the preset axis on the current node.

2. The method of claim 1, wherein the attribute information of the neighbouring node comprises a type of the neighbouring node, wherein the type of the neighbouring node comprises at least one of: a surface sharing neighbouring node neighbouring the current node at a surface, an edge sharing neighbouring node neighboring the current node at an edge, or a vertex sharing neighbouring node neighbouring the current node at a vertex;
   wherein the current node has 6 surface sharing neighbouring nodes, 12 edge sharing neighbouring nodes, and 8 vertex sharing neighbouring nodes.

3. The method of claim 1, wherein determining the neighbouring node of the current node comprises at least one of: determining a surface sharing neighbouring node neighbouring the current node at a surface, determining an edge sharing neighbouring node neighbouring the current node at an edge, or determining a vertex sharing neighbouring node neighbouring the current node at a vertex.

4. The method of claim 3, wherein determining the factor of impact of the neighbouring node in direction along the preset axis on the current node based on the attribute information of the neighbouring node comprises:
   determining coordinate information of a center of the current node; and
   determining the factor of impact of the neighbouring node in direction along the preset axis on the current node based on the coordinate information of the center and the attribute information of the neighbouring node.

5. The method of claim 4, wherein determining the factor of impact of the neighbouring node in direction along the preset axis on the current node based on the coordinate information of the center and the attribute information of the neighbouring node comprises:
   in response to the attribute information of the neighbouring node indicating that the neighbouring node comprises the surface sharing neighbouring node, determining a factor of impact of the surface sharing neighbouring node in direction along the preset axis on the current node based on the coordinate information of the center of the current node and the surface sharing neighbouring node;
   in response to the attribute information of the neighbouring node indicating that the neighbouring node comprises the edge sharing neighbouring node, determining a factor of impact of the edge sharing neighbouring node in direction along the preset axis on the current node based on the coordinate information of the center of the current node and the edge sharing neighbouring node; and
   in response to the attribute information of the neighbouring node indicating that the neighbouring node comprises the vertex sharing neighbouring node, determining a factor of impact of the vertex sharing neighbouring node in direction along the preset axis on the current node based on the coordinate information of the center of the current node and the vertex sharing neighbouring node.

6. The method of claim 5, further comprising: in response to the neighbouring node comprising the surface sharing neighbouring node, the edge sharing neighbouring node, and the vertex sharing neighbouring node,
   obtaining a coordinate correction value of the current node in direction along the preset axis by performing weighting on the factor of impact of the surface sharing neighbouring node, the factor of impact of the edge sharing neighbouring node, and the factor of impact of the vertex sharing neighbouring node in direction along the preset axis on the current node based on a weight of the surface sharing neighbouring node, a weight of the edge sharing neighbouring node, and a weight of the vertex sharing neighbouring node of the current node; and
   determining the coordinates of the current node after geometry reconstruction based on the coordinate information of the center of the current node and the coordinate correction value of the current node in direction along the preset axis.

7. The method of claim 6, wherein determining the weight of the neighbouring node of the current node comprises:
   determining a preset ratio among the weight of the surface sharing neighbouring node, the weight of the edge sharing neighbouring node, and the weight of the vertex sharing neighbouring node based on distances from the current node to the surface sharing neighbouring node, the edge sharing neighbouring node, and the vertex sharing neighbouring node;
   obtaining a normalized coefficient by normalizing the preset ratio; and
   determining the weight of the surface sharing neighbouring node, the weight of the edge sharing neighbouring node, and the weight of the vertex sharing neighbouring node of the current node based on the normalized coefficient and the preset ratio.

8. The method of claim 7, further comprising:
   in response to the preset ratio being $$1:\frac{1}{\sqrt{2}}:\frac{1}{\sqrt{3}}$$

determining the weight of the surface sharing neighbouring node to be 0.081, the weight of the edge sharing neighbouring node to be 0.057, and the weight of the vertex sharing neighbouring node to be 0.046; or
   in response to the preset ratio being $$1:\frac{1}{2}:\frac{1}{3},$$

determining the weight of the surface sharing neighbouring node to be 0.115, the weight of the edge sharing neighbouring node to be 0.057, and the weight of the vertex sharing neighbouring node to be 0.038.

9. The method of claim 6, wherein determining the coordinates of the current node after geometry reconstruction based on the coordinate information of the center of the current node and the coordinate correction value of the current node in direction along the preset axis comprises:
   obtaining the coordinates of the current node after geometry reconstruction as a sum of the coordinate information of the center of the current node and the coordinate correction value of the current node in direction along the preset axis.

10. The method of claim 9, wherein the coordinates of the current node after geometry reconstruction comprises an X coordinate after geometry reconstruction, a Y coordinate after geometry reconstruction, and a Z coordinate after geometry reconstruction,
   wherein obtaining the coordinates of the current node after geometry reconstruction as the sum of the coordinate information of the center of the current node and the coordinate correction value of the current node in direction along the preset axis comprises:
   obtaining the X coordinate of the current node after geometry reconstruction as a sum of X coordinate information of the center of the current node and an X coordinate correction value of the current node;
   obtaining the Y coordinate of the current node after geometry reconstruction as a sum of Y coordinate information of the center of the current node and a Y coordinate correction value of the current node; and
   obtaining the Z coordinate of the current node after geometry reconstruction as a sum of Z coordinate information of the center of the current node and a Z coordinate correction value of the current node.

11. The method of claim 5, further comprising: in response to the neighbouring node comprising only the surface sharing neighbouring node,
   obtaining a coordinate correction value of the current node in direction along the preset axis by performing weighting on the factor of impact of the surface sharing neighbouring node in direction along the preset axis on the current node based on a weight of the surface sharing neighbouring node of the current node; and
   determining the coordinates of the current node after geometry reconstruction based on the coordinate information of the center of the current node and the coordinate correction value of the current node in direction along the preset axis.

12. The method of claim 11, wherein determining the coordinates of the current node after geometry reconstruction based on the coordinate information of the center of the current node and the coordinate correction value of the current node in direction along the preset axis comprises:
obtaining the coordinates of the current node after geometry reconstruction as a sum of the coordinate information of the center of the current node and the coordinate correction value of the current node in direction along the preset axis.

13. The method of claim 11, wherein the weight of the surface sharing neighbouring node is a preset constant, wherein the preset constant is ¼.

14. The method of claim 5, further comprising: in response to the neighbouring node comprising the surface sharing neighbouring node and the edge sharing neighbouring node,
obtaining a coordinate correction value of the current node in direction along the preset axis by performing weighting on the factor of impact of the surface sharing neighbouring node and the factor of impact of the edge sharing neighbouring node in direction along the preset axis on the current node based on a weight of the surface sharing neighbouring node and a weight of the edge sharing neighbouring node of the current node; and
determining the coordinates of the current node after geometry reconstruction based on the coordinate information of the center of the current node and the coordinate correction value of the current node in direction along the preset axis.

15. The method of claim 14, wherein determining the coordinates of the current node after geometry reconstruction based on the coordinate information of the center of the current node and the coordinate correction value of the current node in direction along the preset axis comprises:
obtaining the coordinates of the current node after geometry reconstruction as a sum of the coordinate information of the center of the current node and the coordinate correction value of the current node in direction along the preset axis.

16. The method of claim 14, wherein determining the weight of the neighbouring node of the current node comprises:
determining a preset ratio between the weight of the surface sharing neighbouring node and the weight of the side sharing neighbouring node based on distances from the current node to the surface sharing neighbouring node and the side sharing neighbouring node;
obtaining a normalized coefficient by normalizing the preset ratio; and
determining the weight of the surface sharing neighbouring node and the weight of the edge sharing neighbouring node of the current node based on the normalized coefficient and the preset ratio.

17. The method of claim 16, further comprising:
in response to the preset ratio being $$1:\frac{1}{\sqrt{2}},$$

determining the weight of the surface sharing neighbouring node to be 0.13, and the weight of the edge sharing neighbouring node to be 0.091; or
in response to the preset ratio being $$1:\frac{1}{2},$$

determining the weight of the surface sharing neighbouring node to be 0.166, and the weight of the edge sharing neighbouring node to be 0.083.

18. The method of claim 4, wherein determining the factor of impact of the neighbouring node in direction along the preset axis on the current node comprises determining whether the neighbouring node contains a point.

19. The method of claim 1, further comprising:
obtaining spatial scalability enabled flag information by parsing a bitstream; and
in response to the spatial scalability enabled flag information indicating not to decode a skip layer containing the current node, determining the neighbouring node of the current node based on the location information of the current node.

20. The method of claim 19, further comprising:
in response to the spatial scalability enabled flag information having a first value, determining that the spatial scalability enabled flag information indicates to decode the skip layer containing the current node; and
in response to that the spatial scalability enabled flag information having a second value, determining that the spatial scalability enabled flag information indicates not to decode the skip layer containing the current node.

* * * * *